United States Patent
Ziv et al.

(10) Patent No.: US 7,698,291 B2
(45) Date of Patent: Apr. 13, 2010

(54) METHOD AND SYSTEM FOR INTEGRATING USER-DEFINED OBJECTS INTO A BUSINESS MANAGEMENT APPLICATION

(75) Inventors: Tidhar Ziv, Hertzelia (IL); Gilad Z. Gruber, NeveYarak (IL); Eyal A. Melamed, Tel Aviv (IL)

(73) Assignee: SAP AG, Walldorf (DE)

( * ) Notice: Subject to any disclaimer, the term of this patent is extended or adjusted under 35 U.S.C. 154(b) by 608 days.

(21) Appl. No.: 10/926,254

(22) Filed: Aug. 26, 2004

(65) Prior Publication Data
US 2006/0047525 A1 Mar. 2, 2006

(51) Int. Cl.
*G06F 7/00* (2006.01)
*G06F 17/00* (2006.01)

(52) U.S. Cl. .............................. 707/102; 707/2; 707/3; 707/10; 707/101; 707/103 R; 707/104.1; 717/100; 717/106; 717/163; 719/315; 719/317; 705/1

(58) Field of Classification Search ...................... 707/1, 707/100
See application file for complete search history.

(56) References Cited

U.S. PATENT DOCUMENTS

| | | | | | |
|---|---|---|---|---|---|
| 5,583,983 | A | * | 12/1996 | Schmitter | 717/138 |
| 5,584,035 | A | * | 12/1996 | Duggan et al. | 715/765 |
| 5,907,704 | A | * | 5/1999 | Gudmundson et al. | 717/100 |
| 5,950,010 | A | * | 9/1999 | Hesse et al. | 717/178 |
| 6,014,666 | A | * | 1/2000 | Helland et al. | 707/9 |
| 6,113,649 | A | * | 9/2000 | Govindaraj | 717/113 |
| 6,230,161 | B1 | * | 5/2001 | Berkland et al. | 707/103 R |
| 6,449,659 | B1 | * | 9/2002 | Caron et al. | 719/315 |
| 6,516,355 | B1 | * | 2/2003 | Hartmann et al. | 719/317 |
| 6,574,736 | B1 | * | 6/2003 | Andrews | 726/21 |
| 6,714,928 | B1 | * | 3/2004 | Calow | 707/4 |
| 6,868,525 | B1 | * | 3/2005 | Szabo | 715/738 |
| 6,931,546 | B1 | * | 8/2005 | Kouznetsov et al. | 726/23 |
| 6,938,041 | B1 | * | 8/2005 | Brandow et al. | 707/10 |
| 7,076,784 | B1 | * | 7/2006 | Russell et al. | 719/315 |
| 7,124,145 | B2 | * | 10/2006 | Surasinghe | 707/102 |
| 2003/0056195 | A1 | * | 3/2003 | Hunt | 717/116 |
| 2003/0229529 | A1 | * | 12/2003 | Mui et al. | 705/8 |
| 2004/0001092 | A1 | * | 1/2004 | Rothwein et al. | 345/763 |
| 2004/0006509 | A1 | * | 1/2004 | Mannik et al. | 705/14 |
| 2004/0015842 | A1 | * | 1/2004 | Nanivadekar et al. | 717/109 |
| 2004/0122731 | A1 | * | 6/2004 | Mannik et al. | 705/14 |
| 2004/0233232 | A1 | * | 11/2004 | Iborra et al. | 345/700 |

(Continued)

*Primary Examiner*—Hosain T Alam
*Assistant Examiner*—Usmaan Saeed
(74) *Attorney, Agent, or Firm*—Kenyon & Kenyon LLP

(57) ABSTRACT

A method and system for integrating user-defined objects into a business management application. A mode is selected with which to add a user-defined object in the application having a base class of objects with a base class of services. Information is received to define the user-defined object. A selection is received of at least one service from the base class of services to be associated with the user-defined object. At least one field associated with the user-defined object is received for display. Additional information may be received to define a son object of the user-defined object. Business logic may be received to be added to the application. The user-defined object and related information are registered with the application. The integrated user-defined object thereby automatically inherits the selected at least one service from the base class of services of the business management application.

32 Claims, 18 Drawing Sheets

U.S. PATENT DOCUMENTS

| | | | |
|---|---|---|---|
| 2005/0010580 A1* | 1/2005 | Lancefield | 707/100 |
| 2005/0021348 A1* | 1/2005 | Chan et al. | 705/1 |
| 2005/0021971 A1* | 1/2005 | Patankar et al. | 713/176 |
| 2005/0078611 A1* | 4/2005 | Adams et al. | 370/254 |
| 2005/0154699 A1* | 7/2005 | Lipkin et al. | 707/1 |
| 2006/0288023 A1* | 12/2006 | Szabo | 707/100 |

* cited by examiner

1600

METHOD AND SYSTEM FOR INTEGRATING USER-DEFINED OBJECTS INTO A BUSINESS MANAGEMENT APPLICATION

FIELD OF THE INVENTION

The invention relates to software applications for and, in particular to methods and systems for integrating user-defined objects into a business management application so that the user-defined objects automatically inherit specified behaviors/characteristics of a base class of objects in the business management application.

BACKGROUND

It is common that organizations using commercial off-the-shelf business management software application (accounting, logistics, and customer relationship management software) need to extend the software to meet their specific requirements. However, without a new object having unrestricted access to the base class of objects in the business management software application, and without the ability to integrate new objects into the base class, the functionality that can be added is limited. Current business management software applications do not directly support extending the business management software to provide these capabilities to a new object without custom programming to handle data persistence and retrieval, document numbering, logging, user-interface design, and other application services.

Therefore, an automated method and system to permit the automatic incorporation of user-defined objects into business management software is highly desirable.

DETAILED DESCRIPTION

Embodiments of the present invention may include a business software application with a user interface ("UI"), for example, a graphical user interface ("GUI") such as a wizard, for registering a new, user-defined object with the business software application. Specifically, the user-defined object may be registered through a data interface ("DI") application programming interface ("API") to have access to services and functions of a base class of objects in the application. The DI API may expose an object in the business software application that may be used to register the user-defined object. This enables users to have a full and tight integration of their add-on user-defined objects with the base class objects in the business software application. Embodiments of the present invention may also offer a quick way to extend the business software application with new business logic that may be related to a user-defined object or to the base class objects.

The following definitions are provided for selected words and phrases that are used herein.

As used herein, "base class object" refers to an object of a base class. For example, an object that is provided by/with the business software application and has access to base class-level services within/via the business software application.

As used herein, "object type" refers to a type of object. Exemplary object types include master data, master data lines, document and document lines.

As used herein, "pre-defined services" may refer to services to which the base class object may be registered. For, example, the pre-defined services may include a log, a history, etc.

As used herein, "master data object" refers to an object that holds information on an item. For example, an object that holds information about a business partner.

As used herein, "master data line" refers to a son object of the master data object.

As used herein, "document" refers to an object that holds information on an operation. For example, an object that holds information about an invoice.

As used herein, "document line" refers to a son of the document that deals with a specific issue.

As used herein, "son" refers to an object that is a link to a main object.

Figure 1:
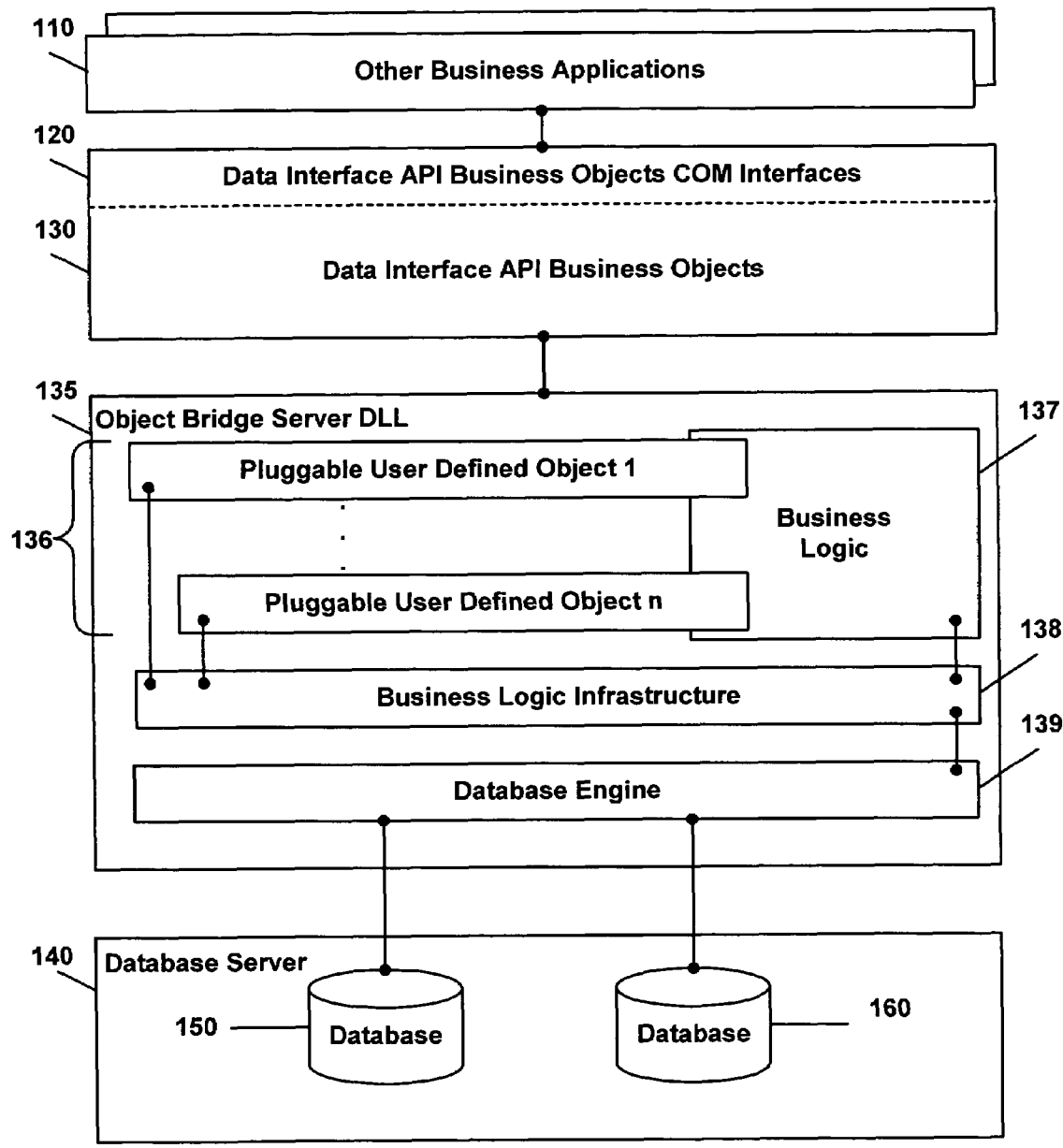
FIG. 1 is a high-level block diagram of a computer system incorporating a functional data interface ("DI") application programming interface ("API") which may communicate with component object model ("COM") objects to interface to a host business database, in accordance with an embodiment of the present invention.

FIG. 1 is a high-level block diagram of a computer system incorporating a functional data interface application programming interface, which may communicate with component object model ("COM") objects that interface to a host business database, in accordance with an embodiment of the present invention. In FIG. 1, one or more business applications 110, for example, one or more third party software applications, may be coupled to data interface API business objects COM interfaces 120 in data interface API business objects 130. Data interface API business objects COM interfaces 120 may be coupled to a database server system 140 through an object bridge server dynamic link library (DLL) 135. For example, data interface API business objects 130 may be coupled through object bridge server DLL 135 to one or more databases 150, 160, for one or more business databases, in database server system 140.

In accordance with an embodiment of the present invention, in FIG. 1, data interface API business objects COM interfaces 120 may make the internal business objects in databases 150, 160 externally available to one or more business applications 110 for extracting and/or inserting data into databases 150, 160. Data interface API business objects COM interfaces 120 may support large-scale data exchange so that large objects as well as a large amount of objects may be exchanged between one or both of databases 150, 160 and one or more business applications 110. A suitable mechanism to affect the data exchange may describe the business objects hierarchy and relations in a self-explained manner and may include using the extensible Markup Language ("XML") standard. Using XML provides the benefit of schemas for data validations and is easy to manipulate. While data interface API business objects COM interfaces 120 may support XML in data interface API business objects 130, data interface API business objects COM interfaces 120 may also enhance the XML interface by allowing data manipulation via simple generic methods (not via data interface API business objects 130) and using more structured XML, that is, the structure of the XML may be nested as the objects relations in databases 150, 160. Use of the generic methods and structured XML may make data interface API business objects COM interfaces 120 more flexible and powerful to users as well as being easier to develop and maintain. Likewise, web access for databases 150, 160 may, for example, be easily implemented via an active server page ("ASP") that may wrap up the generic methods with extensible Stylesheet Language ("XSL") and Java Scripts.

In FIG. 1, in accordance with an embodiment of the present invention, data interface API business objects COM interfaces 120 may be based on COM technology. As a result, data interface API business objects COM interfaces 120 may be implemented on the client side as a dynamic link library ("DLL"). In multi-user embodiments, the DLL may be made available to each client by being loaded separately onto each client or, in a server environment that handles concurrent calls, the DLL may be implemented to be loaded to all clients. The server may serve as a centralized unit to handle the database connection pool as well as threads. In accordance with an embodiment of the present invention, data interface API business objects COM interfaces 120 may not support re-entrant code and database connection reuse. The user, for example, may either load data interface API business objects COM interfaces 120 as a DLL to their client applications or implement the server to load it. Implementing data interface API business objects COM interfaces 120 from the server enables the server to handle concurrency issues like threads and database connection pools, thread safe code, synchronous and asynchronous calls and other scalability issues.

The COM automation may allow a business database's object properties to be externalized so the user may assign and use them in a simple manner with, for example, Visual Basic ("VB") and/or C++. Although the access realized by using C++ is not as "transparent" as with VB, the business objects may still be externalized via a COM automation mechanism and the user may instantiate them in the client application. In order to populate those objects with data, the user may use the assign operation for each property used. Unfortunately, this mechanism is, generally, both inefficient and tedious. For example, in a DLL configuration, it may take many method invocations and in a distributed COM ("DCOM") configuration, or any other configuration that involves a server element, it may cause many inter process communication ("IPC") calls. The IPC calls may be networked, since the client application, generally, runs on a separate machine. The result may be a program that produces many network calls instead of a single call in order to populate a single business object. A major advantage of the properties' use may be the easy way of code writing in VB, since VB may allow a programmer to browse through the business objects and their properties and methods in a graphic way. When considering this advantage versus the disadvantage of increased method invocations, execution efficiency is usually preferable.

Further, an object bridge server DLL 135 may be a COM Object Bridge Server ("OBS") and its method invocations may be in the same address space. Nevertheless, using COM may cause marshaling and un-marshaling of the data and return value, which may cause poor performance while using the API intensively. When upgrading the COM to DCOM in order to have a centralized server, the calls may be IPC calls, which likely are not only out of the client address space, but probably not on the same machine. Thus, the performance of the centralized server environment may be much worse than the distributed configuration. Another consideration involves the use of other programming and scripting languages, such as, ASP and Java. Unfortunately, although these tools do not currently benefit from the COM automation and the programmer may not browse the business objects and their methods and properties like programmers that use VB, future upgrades may enable the efficient use of these other languages. Therefore, the advantage of externalizing an object's fields via COM automation properties is, generally, VB oriented.

The object bridge server DLL 135 may include one or more pluggable user defined objects 136, which have been defined by and/or for one or more business applications 110. One or more pluggable user defined objects 136 may be associated with business logic 137, which may define the system set of business objects that may be supplied with a business application for accessing databases 150, 160. One or more pluggable user defined objects 136 and business logic 137 may each be connected to a business logic infrastructure 138 that may include the business objects infrastructure on which both the system business objects and one or more pluggable user defined objects 136 are built. Business logic infrastructure 138 may be connected to a database engine 139, which may be connected to databases 150, 160. Database engine 139 may act as a database abstraction engine to access databases 150, 160.

In a multi-user environment, data interface API business objects COM interfaces 120 may handle concurrent calls. Regardless of whether this concurrency support will be implemented in-house or by external (that is, third party) implementers, it may be used to implement a scalable system. Data interface API business objects COM interfaces 120 may communicate with the business database via object bridge server DLL 135, which may have connections management in a multi-threaded environment. The connection management may be orthogonal to the thread management and the user may have proprietary knowledge of the use of object bridge server DLL 135. Therefore, concurrency may be handled by supporting it internally in data interface API business objects COM interfaces 120. In a multi-user environment or for heavy-duty tasks like migration of legacy systems to a business database, in accordance with embodiments of the present invention, a server element may be used as an API that manages threads for concurrency support.

In accordance with an embodiment of the present invention, a user-defined object system may permit users to add their own object(s) into the base class of objects that may be provided with the business software application. The system may provide users with an easy way to use a set of services that the application offers its base objects for the user-defined object. This feature is especially useful for users who need to add new business logic or new objects to the business software application. This will enable users to add new user-defined objects in a short time by re-using code that is already in the business software application.

The implementation of this feature in the business software application may include registration of the user-defined object and implementation of additional business logic associated with the user-defined object. The registration may be accomplished using a wizard with graphical user interfaces ("GUI"), which may guide the user through the process of defining and creating a new user-defined object. The implementation of the additional business logic may extend the base services that the user-defined object may inherit from the base class of objects and extend the methods according to the object business logic. Implementing additional business logic is optional and may be used to add a new business process to the base class of objects. In general, users may create the new business logic using a standard high-level programming language, for example, an object-oriented language such as C++, VB, or the like.

In accordance with an embodiment of the present invention, a UI/DI extension for supporting the user-defined object may be implemented to include a DI API and a UI API. Specifically, the DI aspect may be implemented using the DI API to expose a new object to supply an interface to the user-defined object. The interface may be implemented as a general interface in order to support all objects developed by users. The user-defined object may be an object like all other objects in the application, and, therefore, through the DI, the user will manipulate the object. Similarly, the DI API may have a new object to support the user defined object registration process. The DI API may also include a method to return a collection of the user defined objects.

A UI-API will give the ability to connect a UI form to a new user defined object. It does so in order to give a user-define object provider the ability to decorate and customize a form, rather than using a default form (NOE) offered by the business software application. The user may also be able to connect a UI form to a system (i.e., base class) object. In some embodiments of the present invention, the UI form may only be able to be connected to objects that are already exposed in the DI.

A UI API may expose an interface that provides a list of functions from which to choose. A user may use the interface to define an additional service contract object beyond what may be currently available in the application. For example, the new service contract object may be defined to have different business logic and a different view than the currently defined service contract in the application.

Currently, in existing systems, to add the new service contract object, a user may:
1. Create a user defined table;
2. Create a new form;
3. Implement all of the business logic associated with the new service contract;
4. Create a link between the new form and the object;
5. Implement all of the basic operations, for example, add, find, update, etc.; and
6. Implement all of the pre-defined services needed for the object, for example, logging.

In accordance with an embodiment of the present invention, to add the new service contract as a user-defined object, it may be sufficient to:
1. Implement a view of the form;
2. Define tables for the user-defined object (i.e., main and son(s), if the user-defined object has one or more sons); and
3. Implement business logic, if the user-defined object has new business logic;
4. Link the new form to the user-defined object (in place of creating the link as described above in existing systems);
5. Register the user-defined object with all of the existing basic operations available for the base class of objects, for example, add, find and update (in place of implementing all of the services as described above in existing systems); and
6. Register the user-defined object to access predefined services for the base class of objects (in place of implementing them as described above in existing systems).

In accordance with an embodiment of the present invention, a method to add the new service contract as a user-defined object may include analyzing an object type, what services may be needed and whether additional logic is needed by the new user-defined object; and registering the user-defined object with the application.

Analyzing an object type, what services may be needed and whether additional logic is needed by the new user-defined object may include: deciding what type of table to create; deciding whether the object may have sons; and deciding which services may be used by the new defined object.

Deciding what type of table to create may include selecting from several available types, for example:
1. No type—the only type supported in existing systems to create a user defined object;
2. Master data type—e.g., Business Partner;
3. Master data lines type—e.g., Address in Business Partner;
4. Document type—e.g., invoice; and
5. Document line type—e.g., content tab in invoice.

Each type may have a different additional field. In the process of creating the table the user may add a new field to set the table type. The user may just create new fields, since all of the default properties for the type may automatically be added by the application. The user may create the tables before and/or during the registration process and just link them during registration.

In accordance with the embodiment of the present invention, the user may decide if the user-defined object has sons. For example, in the present invention, a son may be created for a master data object or a document object. The registration of the sons may be part of the father registration. The type of the son may depend on the father type, since a document (father) may have a document line (son) and master data (father) may have a master data line (son). In general, the user may create the tables before the registration process and link them during registration. However, the tables may also be created during the registration process.

In accordance with the present embodiment, the user may decide on which services to use for the new user-defined object by selecting from among several services. For example, the available services may include:
1. Basic Data Operations (Add, Update, Delete, Cancel, Close, Find, year transfer), with add, update and delete coming automatically for each object;
2. Manage series, in general, relevant only for a document object;
3. NOE—default form connected to the object;
4. Find;
5. Log; and
6. Year transfer—the user will only indicate if the object will have a year transfer.

In accordance with the present embodiment, the user may decide on which services to use for the user-defined object by selecting from among several services. For example, the available services may include deciding whether to extend the methods of the base class of objects, which may be done, for example, using C++, VB or similar programming language. Accordingly, the user may register the user-defined object with the application. For example, the user may use a registration wizard, which may be started from, for example, a menu entry in a tools menu that may start a user-defined object registration wizard. The screens that may be displayed by the wizard may vary according to each user's specific settings and may include various control buttons, such as, for example, cancel, back, next and finish buttons.

Figure 2:
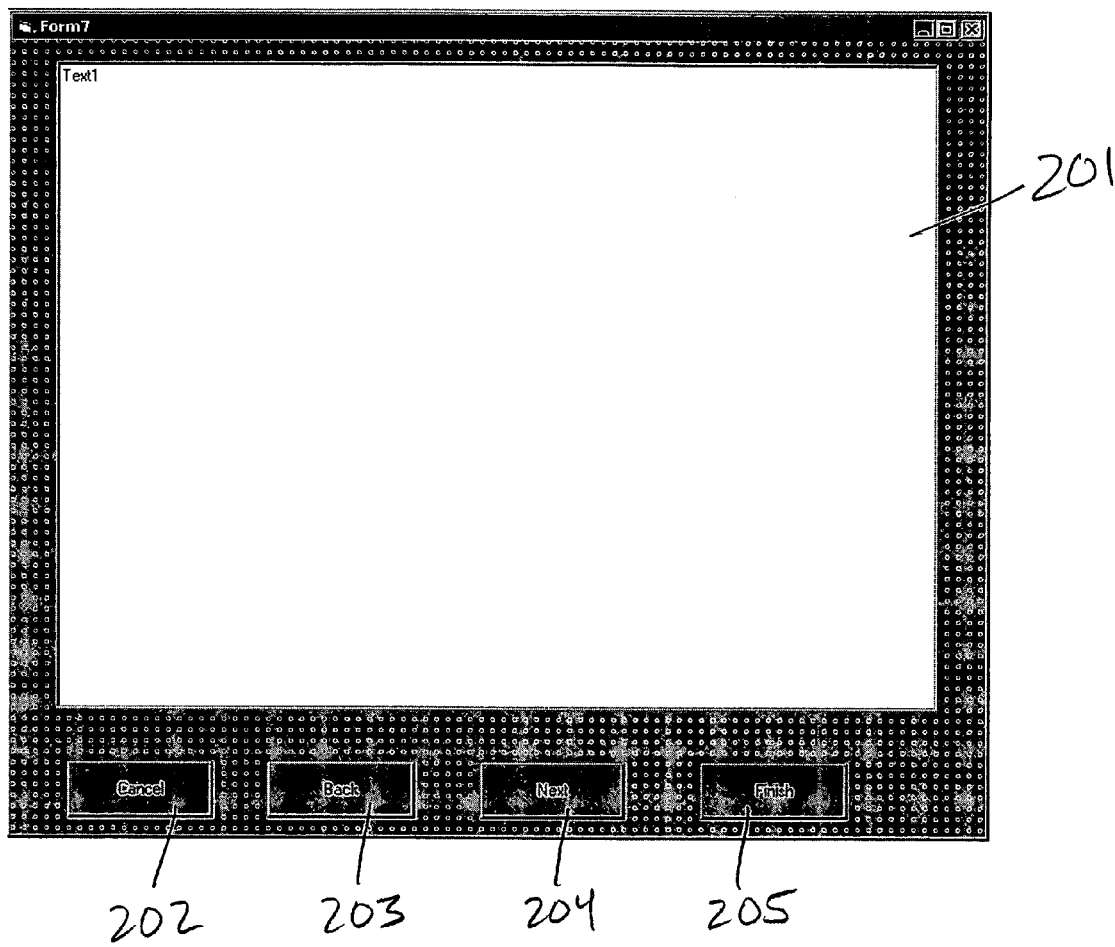
FIG. 2 is a screen shot of a graphical user interface form to provide a description of a wizard to be used to add a user-defined object to an application program, in accordance with an embodiment of the present invention.

FIG. 2 is a screen shot of a graphical user interface form to provide a description of a wizard to be used to add a user-defined object to an application program, in accordance with an embodiment of the present invention. In FIG. 2, a GUI description window 200 may include a description box 201 in which text may be displayed to describe the specific details of the registration wizard. Description window 200 may also include a cancel button 202 that may be used to cancel the registration process by exiting the wizard; a back button 203 that may be used to move back to a previously displayed screen; a next button 204 that may be used to move forward to a next screen; and a finish button 205 that may be used similar to next button 204 to move forward to the next screen or, as in the present embodiment, may be disabled, since, in general, a finish button is used to end the registration process and accept the user entries in one or more screens, whereas there are no user entries in description window 200.

Figure 3:
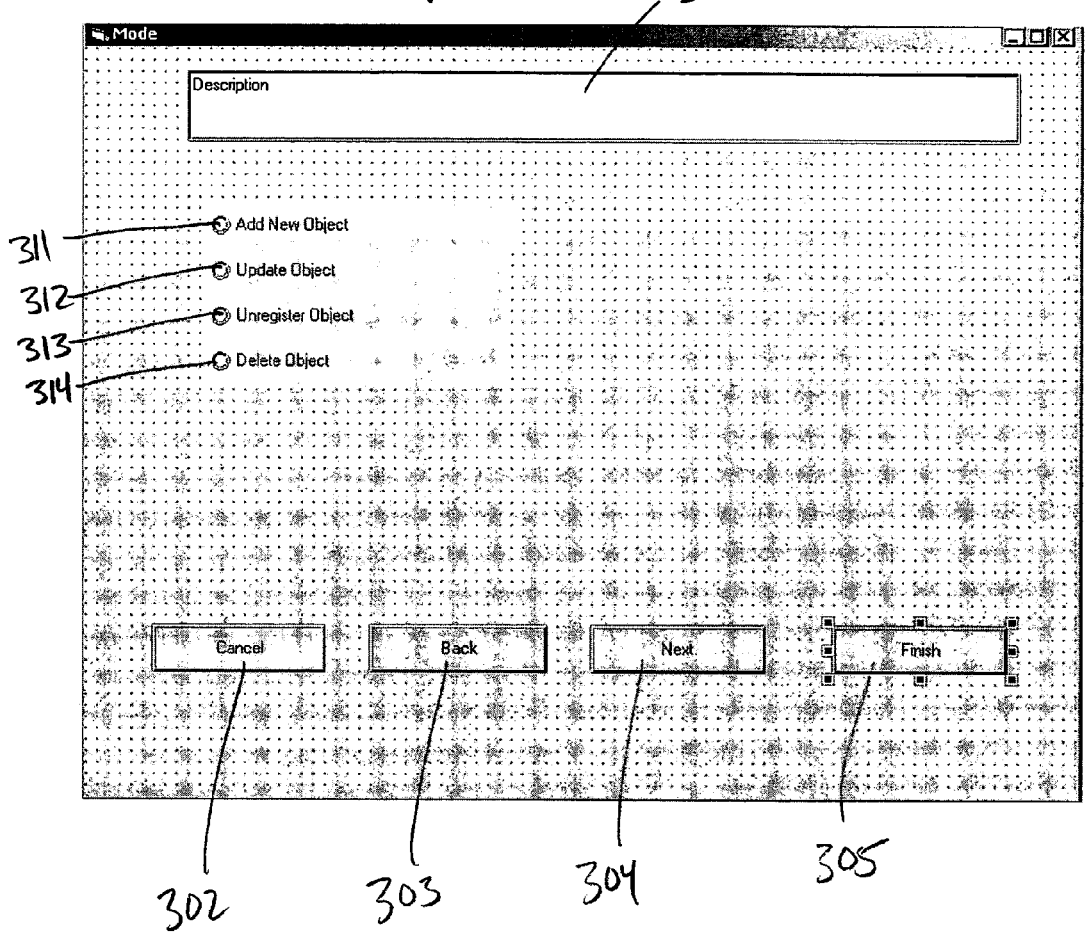
FIG. 3 is a screen shot of a graphical user interface form to provide a listing of modes to be used to register the user-defined object to the application program, in accordance with an embodiment of the present invention.

FIG. 3 is a screen shot of a graphical user interface form to provide a listing of modes to be used to register the user-defined object to the application program, in accordance with an embodiment of the present invention. In FIG. 3, a registration mode screen 300 may include a mode select text box 301 in which a description of the possible modes of operation for the registration process may be provided. Registration mode screen 300 may also include a mode cancel button 302, a mode back button 303, a mode next button 304, and a mode finish button 305, which may all be implemented similar to cancel button 202, back button 203, next button 204 and finish button 205, respectively. Registration mode screen 300 may also include an add new object selection 311, an update object selection 312, an un-register object selection 313, and a delete object selection 314. Add new object selection 311 may be selected by the user to indicate that a new user-defined object is to be added to the base class of objects in the application program. Update object selection 312 may be selected to update one or more settings in a previously registered user-defined object. Un-register object selection 313 may be selected to un-register a user-defined object from the registration object but not remove the user-defined object from the application. Delete object selection 314 may be selected to delete, i.e., completely remove a previously registered user-defined object and all associated user tables from both the registration object and the application. In the present embodiment, if the user chooses update object selection 312, un-register object selection 313, or delete object selection 314, a matrix with all user-defined objects currently in the base class of objects in the application may be displayed for the user to choose which one of the desired user-defined objects is to be used.

Figure 4:
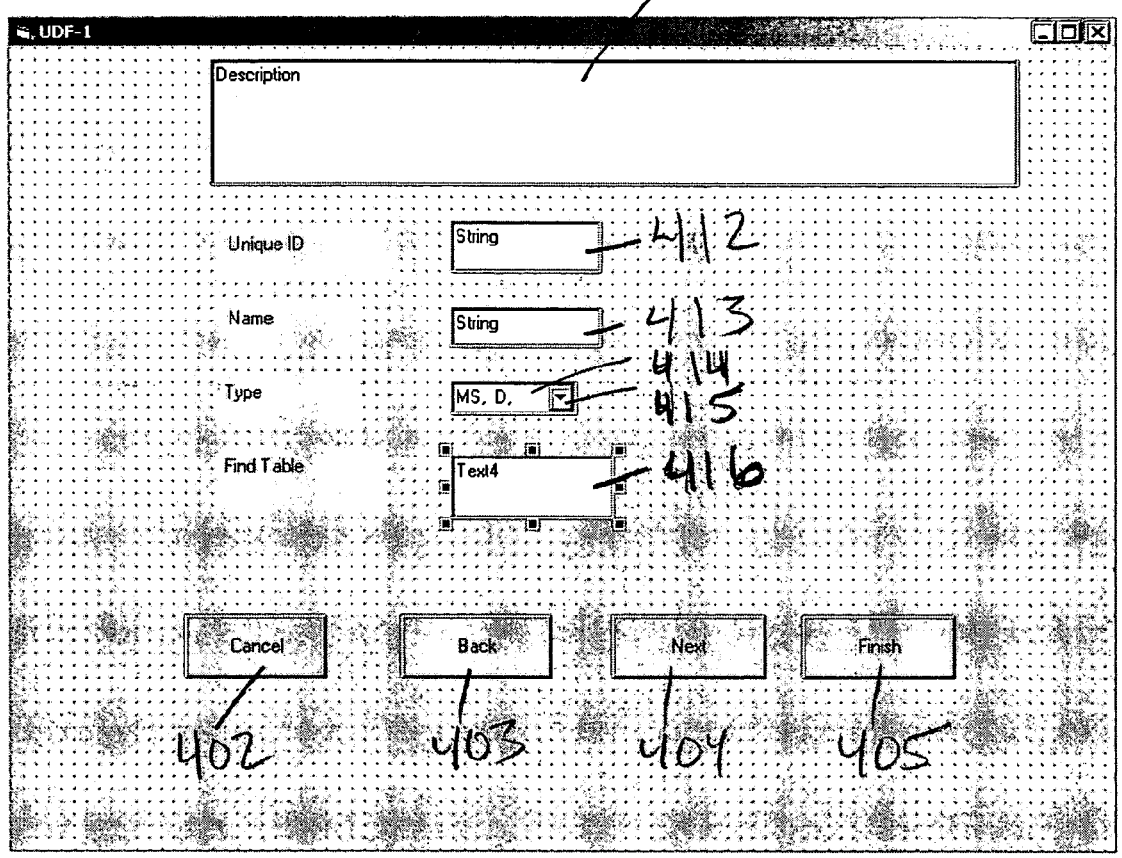
FIG. 4 is a screen shot of a graphical user interface form to provide a listing of basic information to be used to define the user-defined object in the application program, in accordance with an embodiment of the present invention.

FIG. 4 is a screen shot of a GUI form to provide a listing of basic information to be used to define the user-defined object in the application program, in accordance with an embodiment of the present invention. In FIG. 4, an add mode screen 400 may include an add mode text box 401 in which a description of the add mode screen operation may be provided. Add mode screen 400 may also include an add mode cancel button 402, an add mode back button 403, an add mode next button 404, and an add mode finish button 405, which may all be implemented similar to cancel button 202, back button 203, next button 204 and finish button 205, respectively. Add mode screen 400 may also include an unique identification ("ID") field 412, a name field 413, a type field 414 with a selection arrow 415, and a find table field 416. Unique ID field 412 may receive a unique string to be used as a primary key for the user-defined object to be added to the application. Unique ID field 412 may include as part of the unique string a name identifier to identify the specific user and/or implementation of the application. Name field 413 may also receive a unique string that may be used as a name for the user-defined object and may also include the same name identifier used in unique ID field 412 to identify the specific user and/or implementation of the application to indicate that a new user-defined object is to be added to the base class of objects in the application program. Type field 414 may be implemented as a combo box that may display 2 options: a master data object and a document object. Selection arrow 415 may be activated by using a mouse to position a cursor over selection arrow 415, left clicking the mouse to display the possible selections provided by type field 414, highlighting the desired selection by moving the mouse to the desired selection, and selecting the desired selection using the mouse.

In FIG. 4, find table 416 may display a choice from list that may show the tables that may be available for the selected type of user-defined object that is being added to the base class of objects. In general, only tables that match the selected type may be displayed, the displayed tables may not belong to any other object, no tables may be displayed for a none type, and only an empty table may be displayed.

Figure 5:
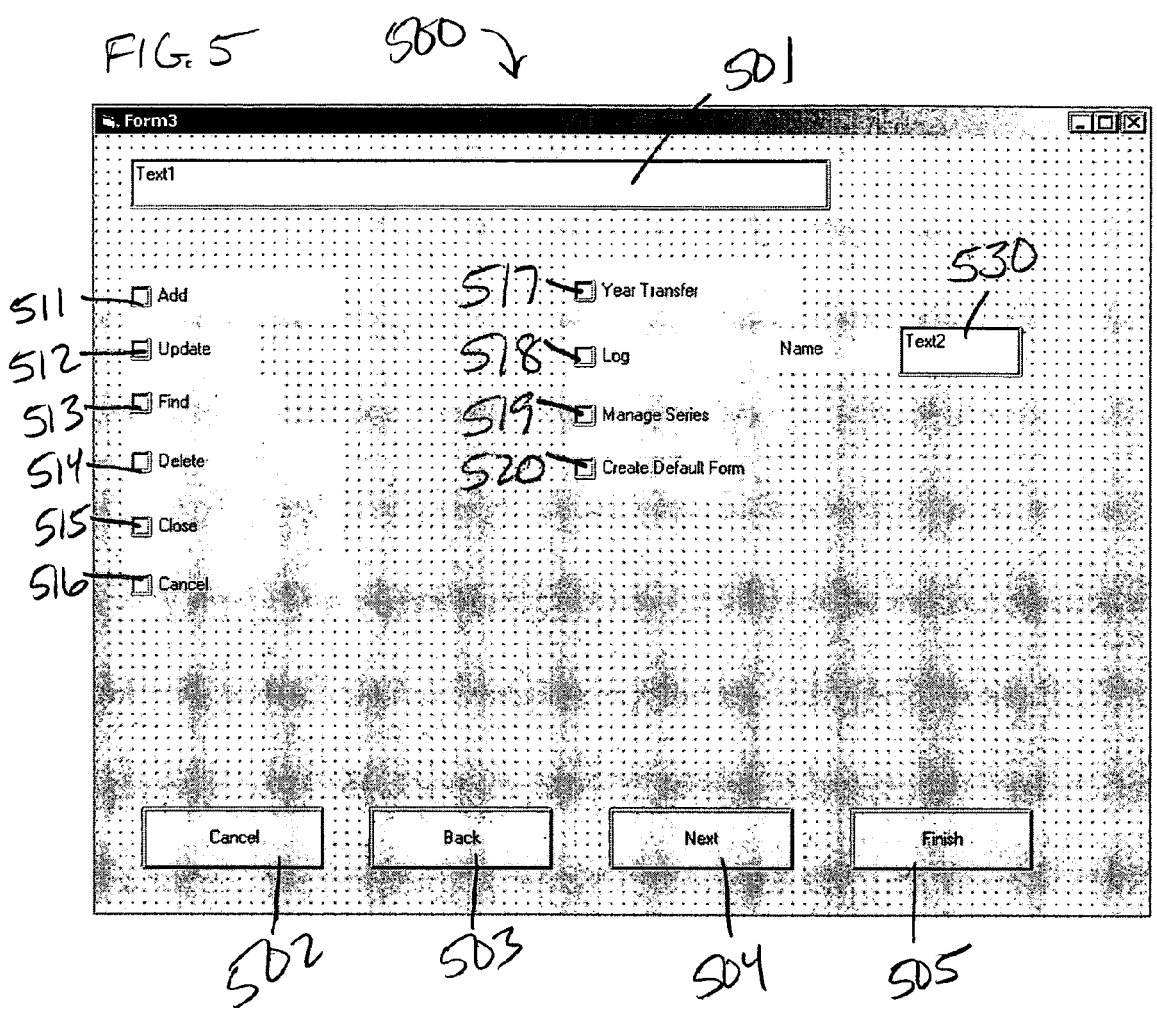
FIG. 5 is a screen shot of a graphical user interface form to provide a listing of base class services available to be associated with the user-defined object in the application program, in accordance with an embodiment of the present invention.

FIG. 5 is a screen shot of a GUI form to provide a listing of base class services available to be associated with the user-defined object in the application program, in accordance with an embodiment of the present invention. In FIG. 5, an add mode define services screen 500 may include an add mode define services text box 501 in which a description of the services available to be added may be provided. Add mode define services screen 500 may also include an add mode cancel button 502, an add mode back button 503, an add mode next button 504, and an add mode finish button 505, which may all be implemented similar to cancel button 202, back button 203, next button 204 and finish button 205, respectively. Add mode define services screen 500 may also include an add service selection 511, an update service selection 512, a find service selection 513, a delete service selection 514, a close service selection 515, a cancel service selection 516, a year transfer service selection 517, a log service selection 518, a manage series service selection 519, and a create default form service selection 520. Add mode define services screen 500 may further include a log name field 530 that may be used to display the name of the original table name with a slight modification to indicate it is no longer the original table.

In FIG. 5, if the user-defined object is a document object, manage series service selection 519 and close service selection 515 may be automatically enabled on the add mode define services screen 500. In general, add service selection 511 and update service selection 512 may be checked for all new user-defined objects in add mode define services screen 500. If the user checks create default form selection 520 or find services selection 513, another screen for each may be displayed to define the fields. In general, the user may only be able to set the manage series service when adding the object.

Figure 6:
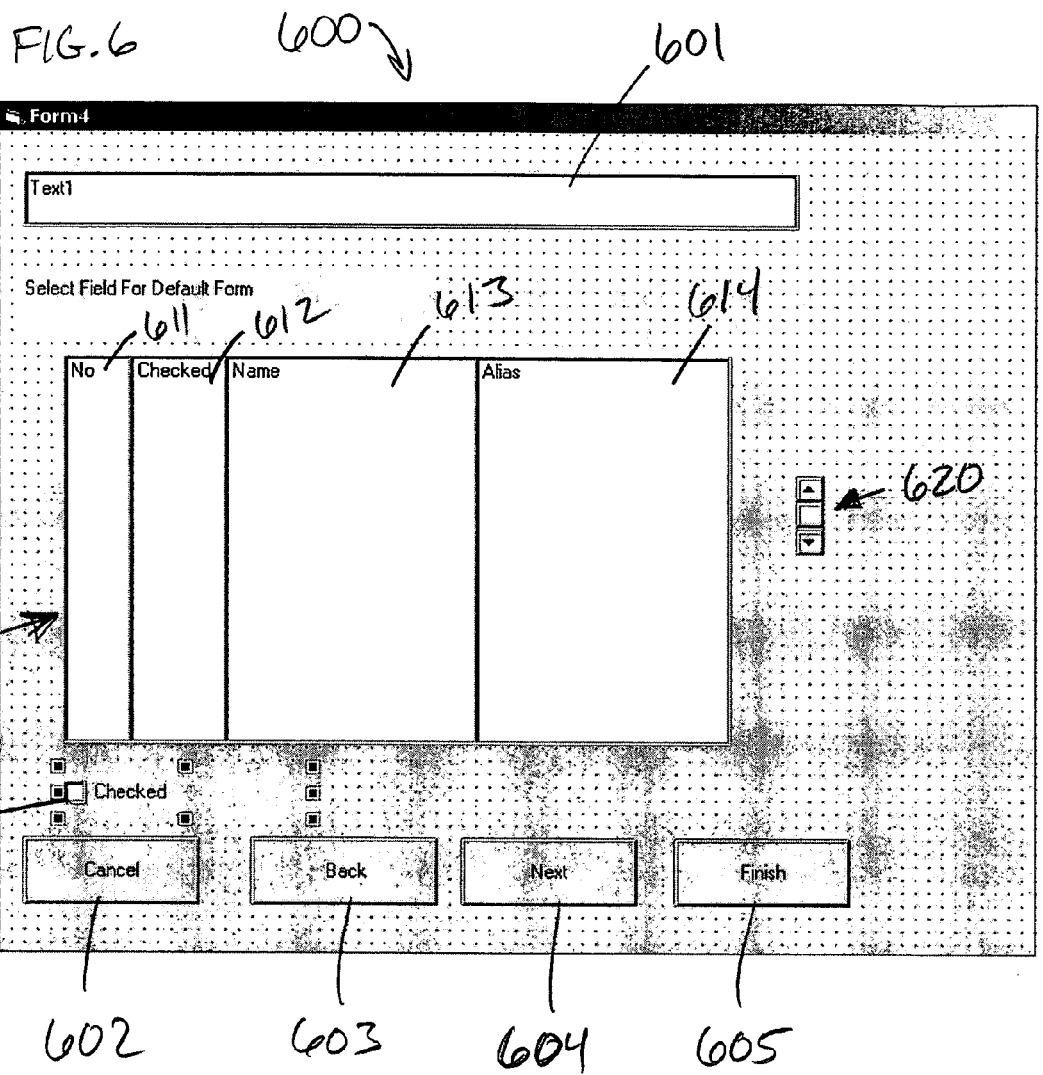
FIG. 6 is a screen shot of a graphical user interface form to provide a listing of a plurality of fields to be selected, to be displayed on a form for the user-defined object in the application program, in accordance with an embodiment of the present invention.

FIG. 6 is a screen shot of a GUI form to provide a listing of a plurality of fields to be selected to be displayed on a form for the user-defined object in the application program, in accordance with an embodiment of the present invention. In FIG. 6, a create default form screen 600 may include a create default form text box 601 in which a description of the create default form may be provided. Create default form screen 600 may also include a user-defined object form cancel button 602, a user-defined object form back button 603, a user-defined object form next button 604, and a user-defined object form finish button 605, which may all be implemented similar to cancel button 202, back button 203, next button 204 and finish button 205, respectively. Create default form screen 600 may further include a table field display area 610 that may have a field number column 611, a checked column 612, a name column 613 and an alias column 614, where each column may be used to display information for all of the fields in the table. An arrow control bar 620 may be used to set the order in which the fields may be displayed within the form. Create default form screen 600 may still further include a check only check box 630, which may cause only those fields relevant to the user-defined object being added to be displayed in table field display area 610.

Figure 7:
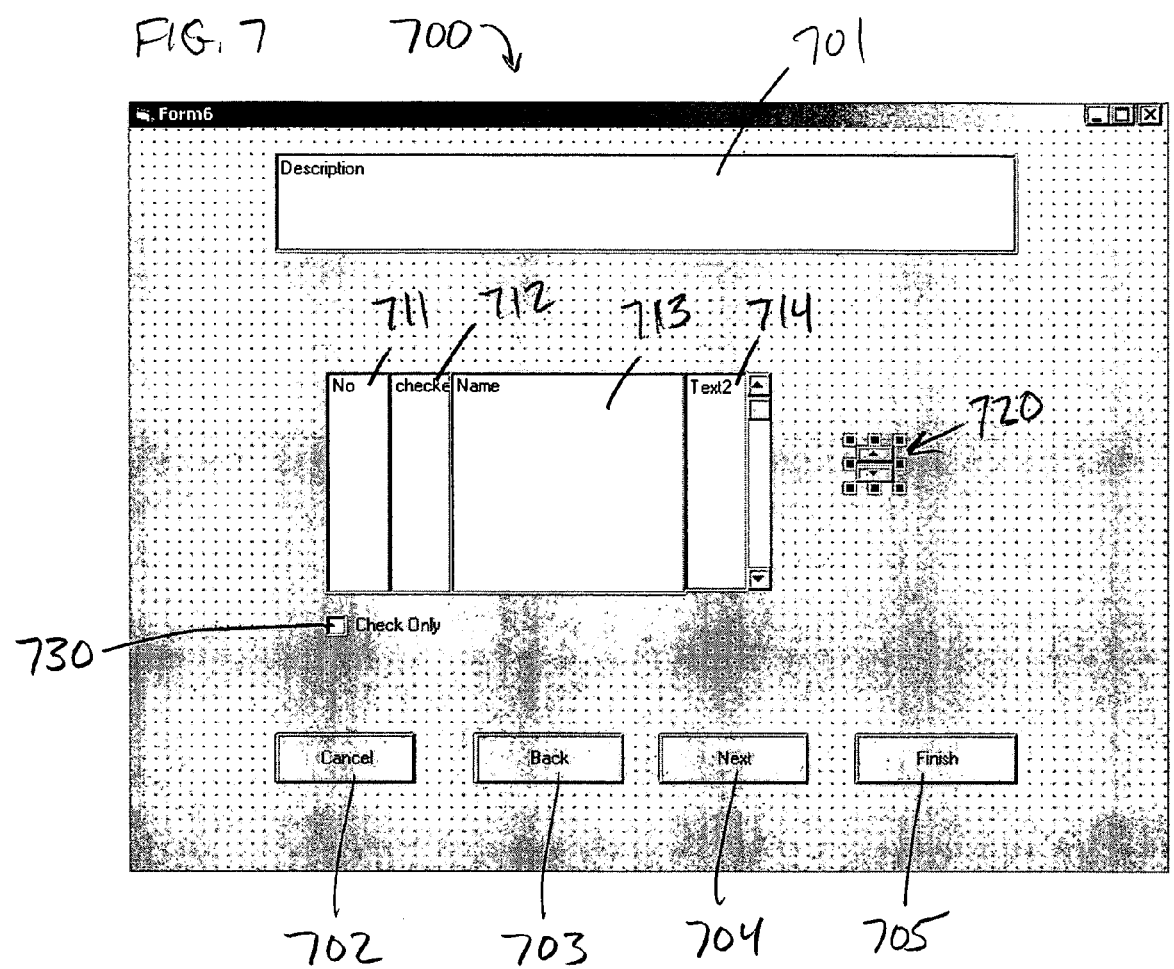
FIG. 7 is a screen shot of a graphical user interface form to provide a listing of a plurality of fields to be selected, to be displayed on a form for a son object in the application program, in accordance with an embodiment of the present invention.

FIG. 7 is a screen shot of a GUI form to provide a listing of a plurality of fields to be selected to be displayed on a form for a son object in the application program, in accordance with an embodiment of the present invention. In FIG. 7, a create son default form screen 700 may include a create son default form text box 701 in which a description of the create default form may be provided. Create son default form screen 700 may also include a son form cancel button 702, a son form back button 703, a son form next button 704, and a son form finish button 705, which may all be implemented similar to cancel button 202, back button 203, next button 204 and finish button 205, respectively. Create son default form screen 700 may further include a son display area 710 that may have a field number column 711, a checked column 712, a name column 713 and a text2 column 714, where each column may be used to display information for all of the sons in the application. For example, all the relevant sons may be displayed according to the type of the user-defined object, the relevant sons may not belong to other objects, and the table may be empty. Text2 column 714, which may be an optionally displayed column, may be used as the log service column for the sons. In general, text2 column 714 may be shown only if the user selected log service selection 518 in FIG. 5. In FIG. 7, text2 column 714 may display a default name for the log table that may be changed by the user. An arrow control bar 720 may be used to set the order in which the sons may be displayed within the form. Create son default form screen 700 may still further include a check only check box 730, which may cause only those sons relevant to the user-defined object being added to be displayed in son display area 710. In case the user defines sons and checked create default form service selection 520 in define services screen 500 in FIG. 5, a create default form screen may be displayed and the user may choose only one son to be associated with this service.

Figure 8:
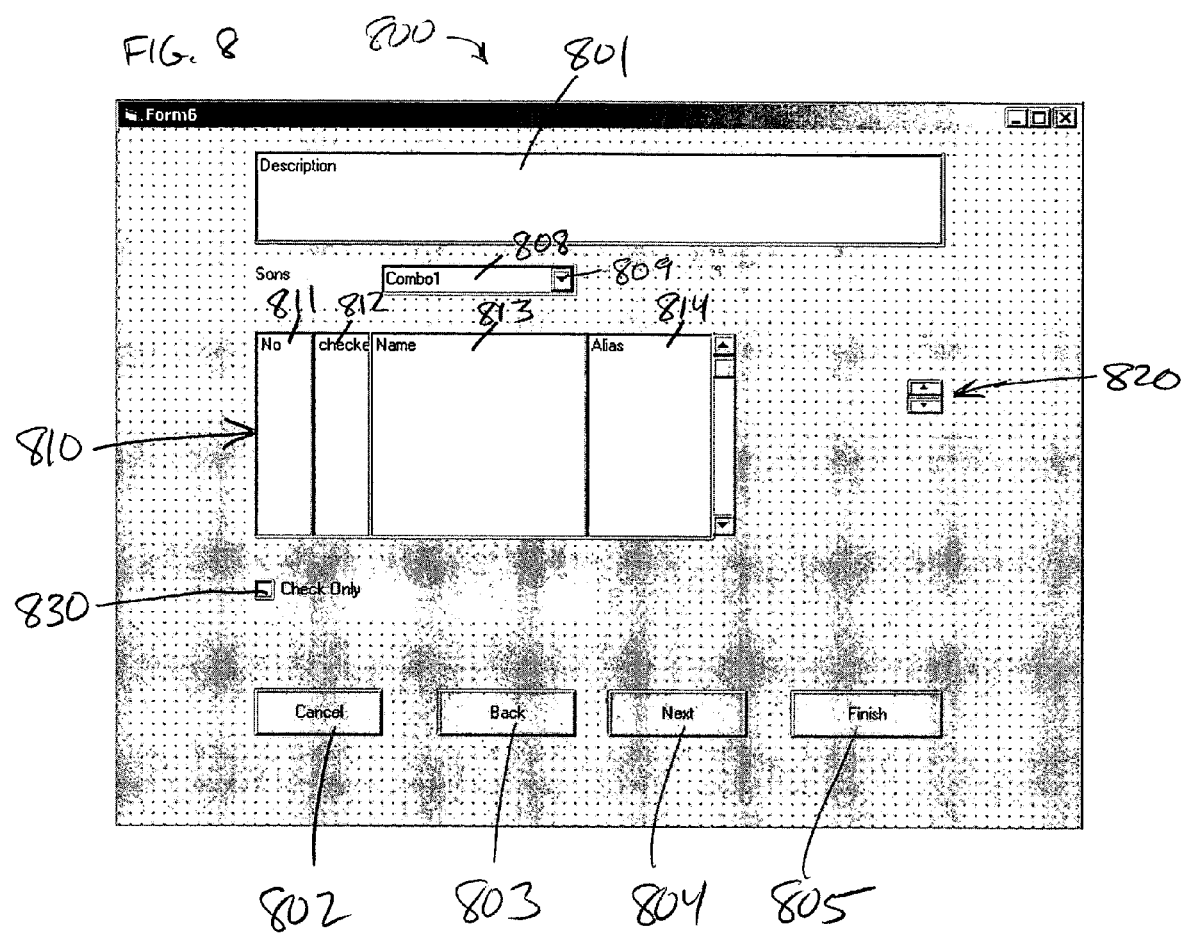
FIG. 8 is a screen shot of a graphical user interface form to provide a listing of a plurality of fields to be selected, to be displayed on the default form for a son object in the application program, in accordance with an embodiment of the present invention.

FIG. 8 is a screen shot of a GUI form to provide a listing of a plurality of fields to be selected to be displayed on the default form for a son object in the application program, in accordance with an embodiment of the present invention. In FIG. 8, a son default form screen 800 may include a create son default form text box 801 in which a description of the create default form may be provided. In general, son default form screen 800 may be displayed, if the user selected create default service selection in FIG. 5 and also defined new sons, and the user may be choose which of the sons to associate with the default form. Create son default form screen 800 may also include a son form cancel button 802, a son form back button 803, a son form next button 804, and a son form finish button 805, which may all be implemented similar to cancel button 202, back button 203, next button 204 and finish button 205, respectively. Son default form screen 800 may also include a son combo box 808 with a son selection arrow 809 that may be used to select a son. Son default form screen 800 may further include a son default form field display area 810 that may have a field number column 811, a checked column 812, a name column 813 and an alias column 814, where each column may be used to display information for all of the fields in the table, similar to create default form 600 of FIG. 6. In FIG. 8, an arrow control bar 820 may be used to set the order in which the fields may be displayed within the form. Son default form screen 800 may still further include a check only check box 830, which may cause only those sons relevant to the user-defined object being added to be displayed in table field display area 810.

Figure 9:
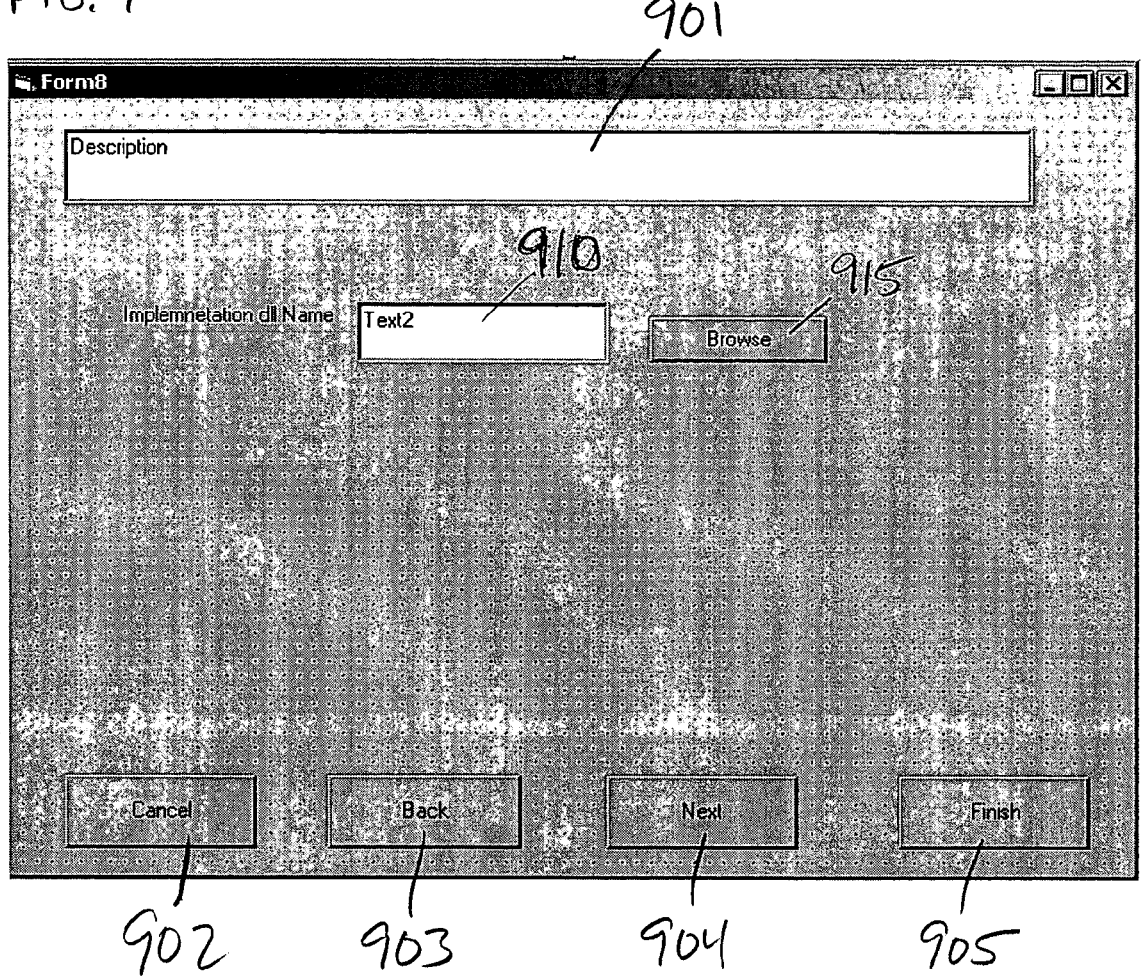
FIG. 9 is a screen shot of a graphical user interface form to associate a new implementation data link library having new business logic with the user-defined object in the application program, in accordance with an embodiment of the present invention.

FIG. 9 is a screen shot of a GUI form to associate a new implementation data link library having new business logic with the user-defined object in the application program, in accordance with an embodiment of the present invention. In FIG. 9, an implementation screen 900 may include an implementation screen text box 901 in which a description of implementation screen 900 may be provided. In general, implementation screen 900 may only be displayed, if the user-defined object is to have new business logic associated with it in the application. Implementation screen 900 may also include an implementation screen cancel button 902, an implementation screen back button 903, an implementation screen next button 904, and an implementation screen finish button 905, which may all be implemented similar to cancel button 202, back button 203, next button 204 and finish button 205, respectively. Implementation screen 900 may also include an implementation DLL name field 910 in which a name of the implementation DLL to be associated with the user-defined object and saved in the user-defined object table may be entered by the user. Alternatively, implementation DLL name field 910 may be filled with existing implementation DLL's by the user selecting a browse button 915, which may cause the wizard to search for, locate and display available implementation DLL's.

Figure 10:
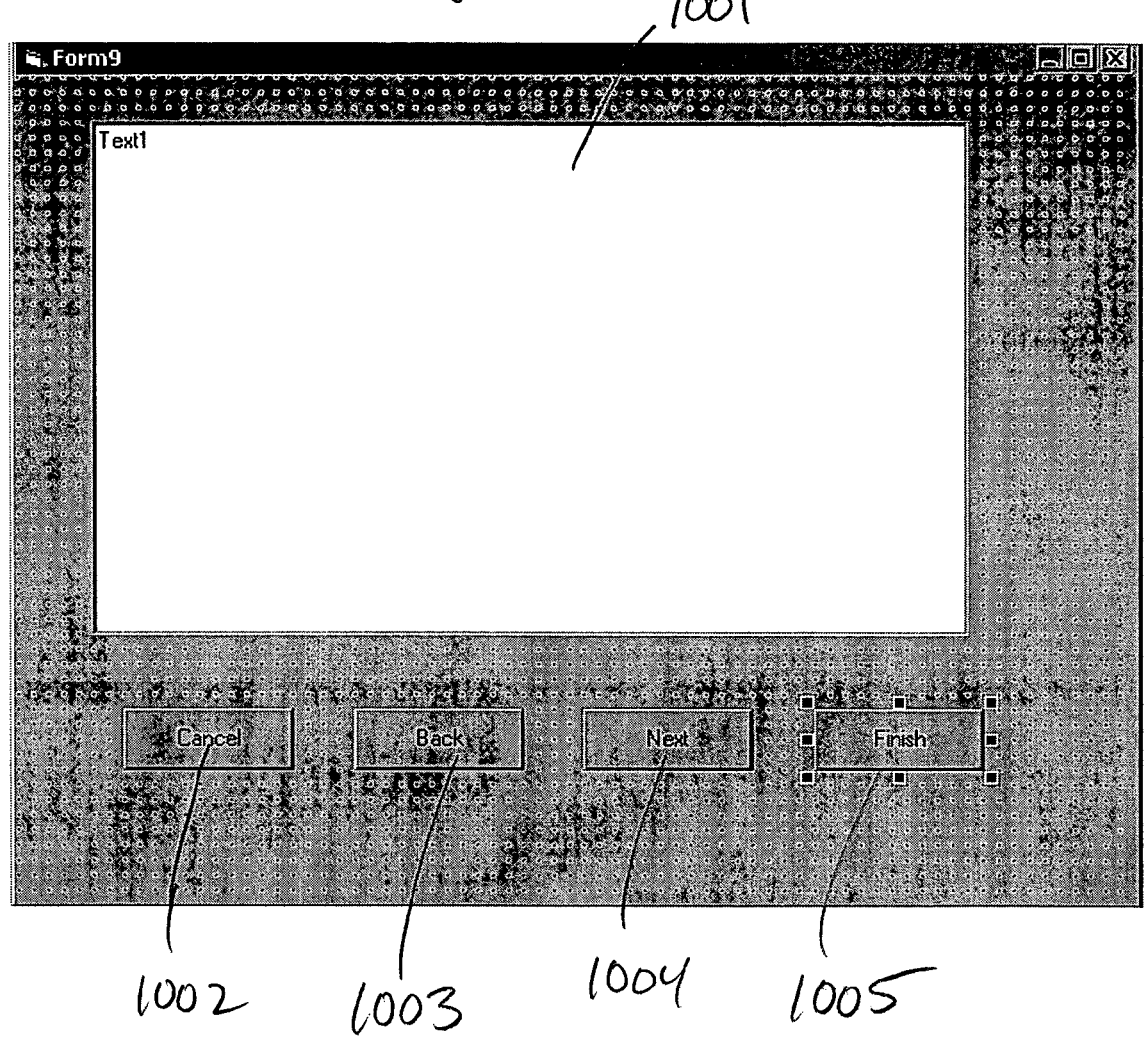
FIG. 10 is a screen shot of a graphical user interface form to provide a summary screen to display a status of the registration of the user-defined object in the application program, in accordance with an embodiment of the present invention.

FIG. 10 is a screen shot of a GUI form to provide a summary screen to display a status of the registration of the user-defined object in the application program, in accordance with an embodiment of the present invention. In FIG. 10, a summary screen 1000 may include a summary status field 1001 to display a text summary message regarding the success or failure of the registration of the user-defined object in the application. Summary screen 1000 may also include a summary screen cancel button 902, a summary screen back button 903, a summary screen next button 904, and a summary screen finish button 905, which may all be implemented similar to cancel button 202, back button 203, next button 204 and finish button 205, respectively. For example, the user may receive a text summary, such as, "Object Successfully Registered," if the user-defined object registration is successful. Conversely, if the user-defined object registration is not successful (i.e., failed), a message indicating the registration was not successful along with a reason for why the user-defined object registration was not successful.

Figure 11:
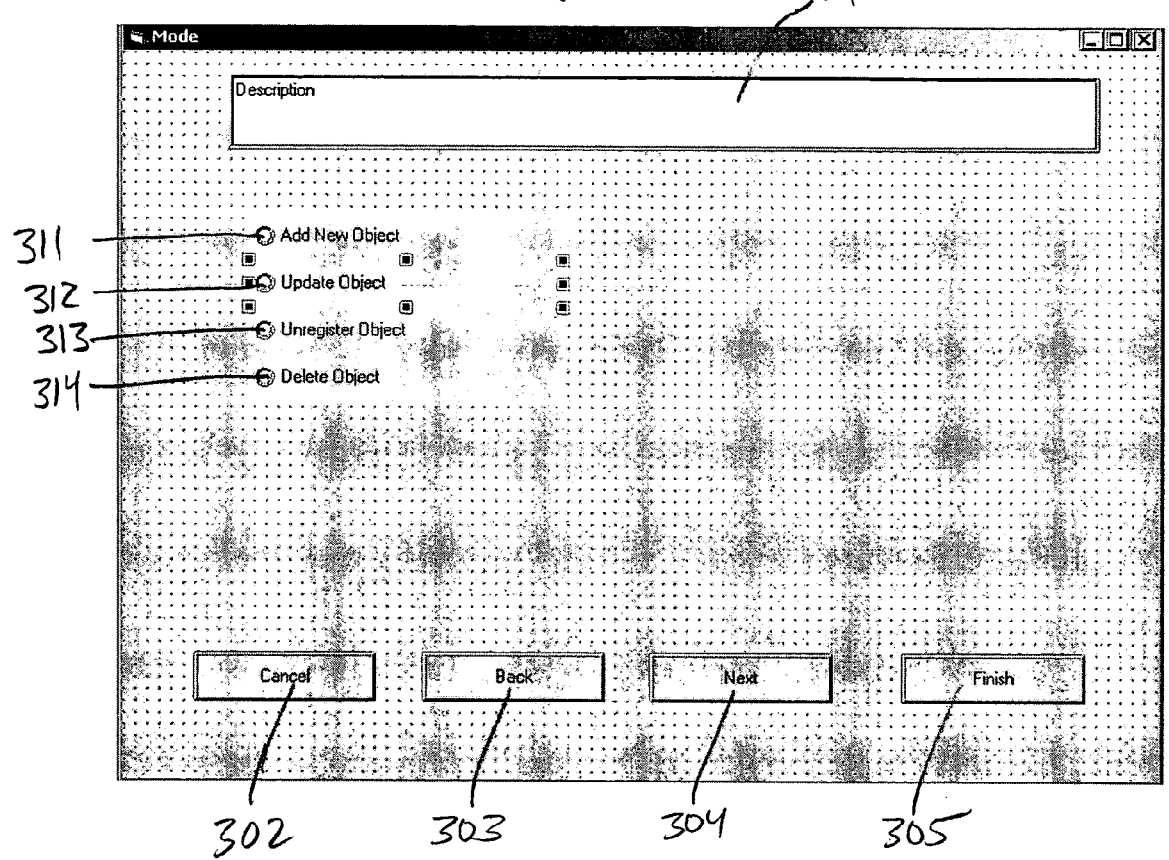
FIG. 11 is a screen shot of the graphical user interface form to provide a listing of modes to be used to update the user-defined object and update object registration to the application program, in accordance with an embodiment of the present invention.

FIG. 11 is a screen shot of the GUI form, like that used in FIG. 3 to register the user-defined object to the application, where the user may select to update an existing user-defined object to the application program. In FIG. 11, if the user chooses update mode by selecting update object collection 312, the object unique ID, name, type and table for any pre-defined user objects may be displayed. Although FIGS. 3 and 11 implement the same form for both registration and updating, different forms could be used.

Figure 12:
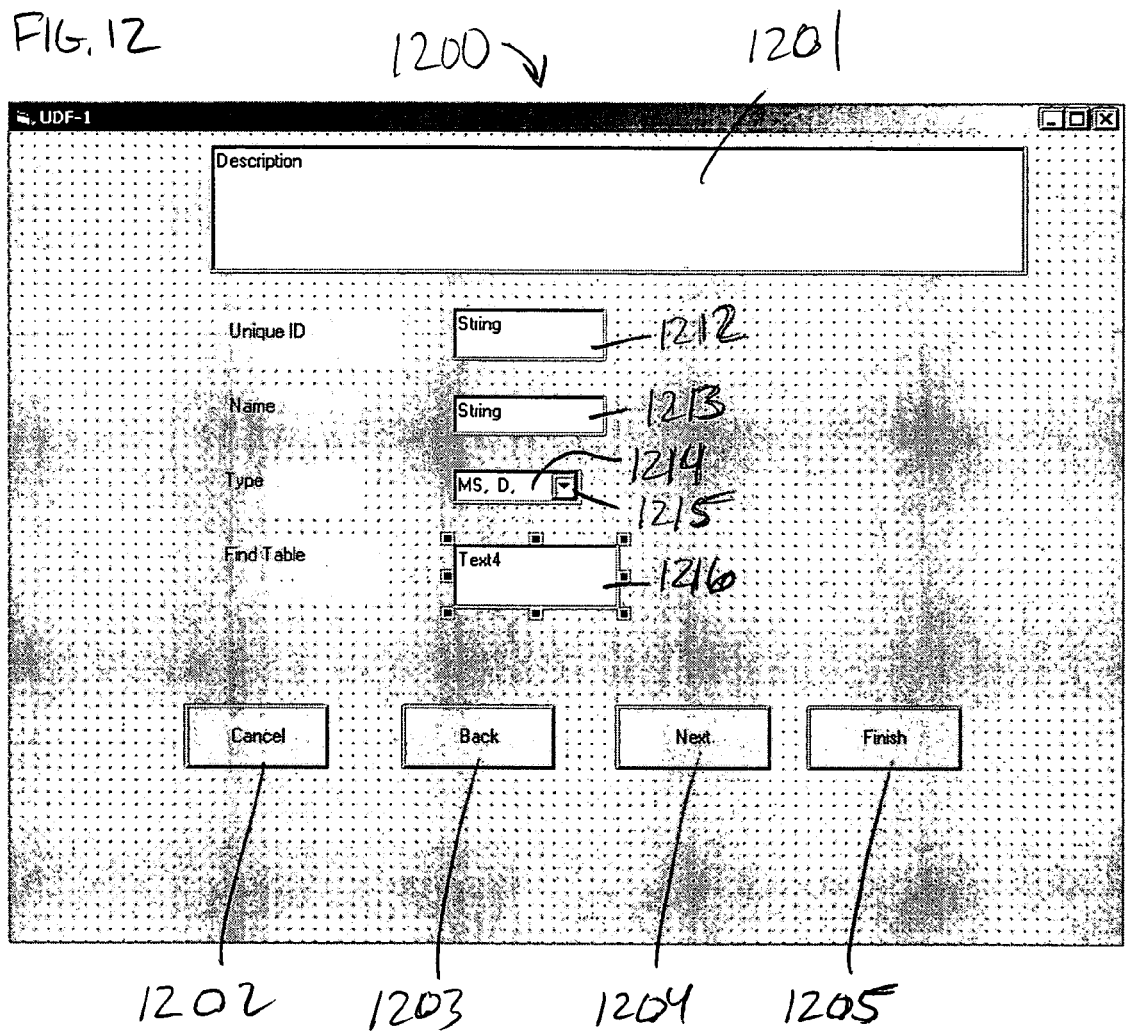
FIG. 12 is a screen shot of the graphical user interface form to provide a listing of basic information to be used to update the user-defined object in the application program, in accordance with an embodiment of the present invention.

FIG. 12 is a screen shot of a GUI form that may provide a listing of existing user-defined objects in the application program that may be selected to be updated. In this exemplary embodiment, the GUI form resembles the form shown in FIG. 4 to define the user-defined object in the application program, although different forms could be used. In FIG. 12, an update mode screen 1200 may include an update mode text box 1201 in which a description of the update mode screen 1200 operation may be provided. Update mode screen 1200 may also include an update mode cancel button 1202, an update mode back button 1203, an update mode next button 1204, and an update mode finish button 1205, which may all be implemented similar to the equivalent buttons in the other exemplary forms, such as those illustrated in FIGS. 2 and 4. Specifically, in FIG. 12, in update mode the user may enter the name of the user-defined object the user wishes to change in a name field 1213 and the information related to the user-defined object may be displayed in the remaining fields, for example, an unique identification ("ID") field 1212, a type field 1214 that may be implemented with a selection arrow 1215, and a find table field 416. In the update mode, unique ID field 1212, type field 1214 and find table field 416 may be implemented as read-only fields based on the name entered into name field 1213.

Figure 13:
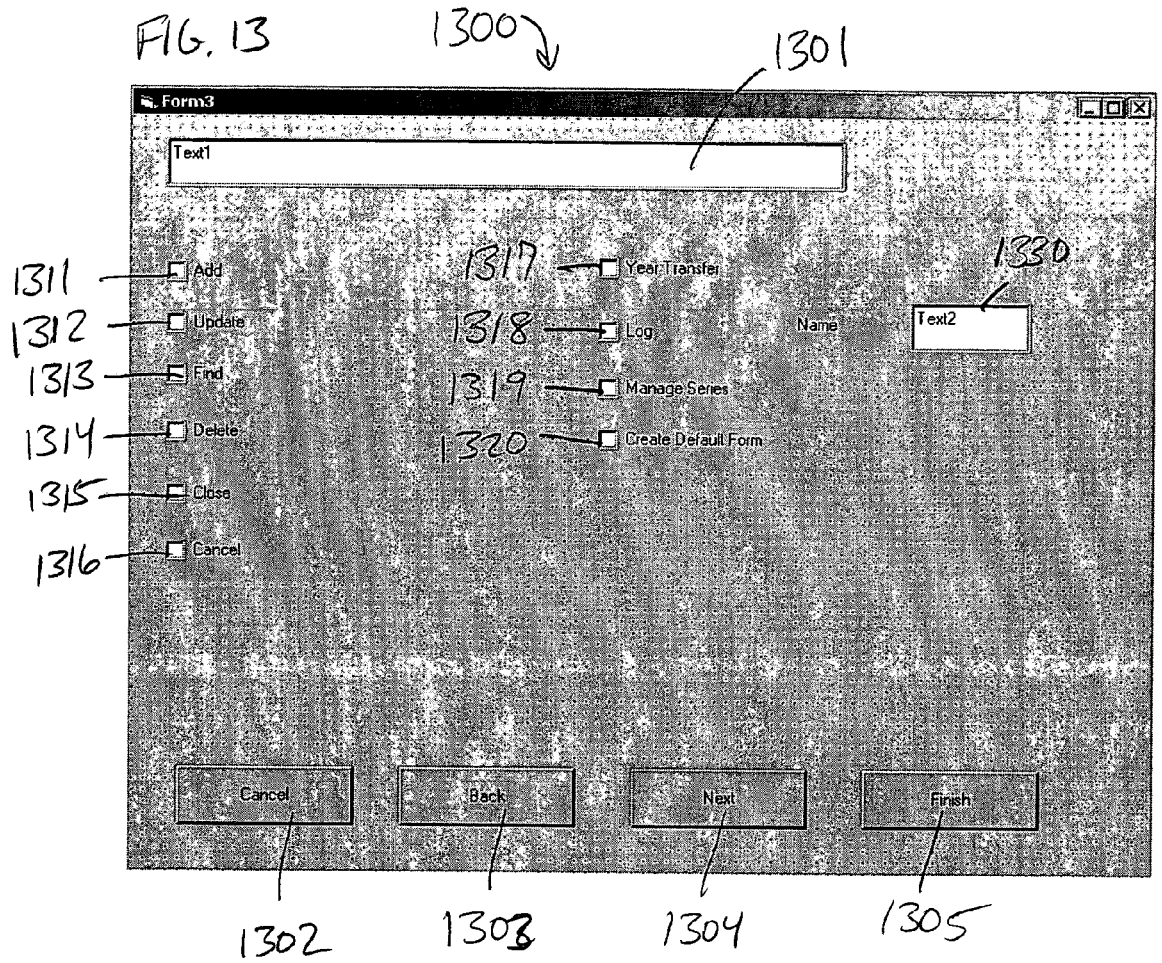
FIG. 13 is a screen shot of the graphical user interface form to provide for updating the listing of base class services associated with and available to be associated with the user-defined object in the application program, in accordance with an embodiment of the present invention.

FIG. 13 is a screen shot of a GUI form used to update the listing of base class services associated with and available to be associated with the user-defined object in the application program. In this exemplary embodiment, the GUI form resembles the form shown in FIG. 5, although a different form could be used for updating. In FIG. 13, an update mode define services screen 1300 may include an add mode define services text box 1301 in which a description of the services available to be added may be provided. Update mode define services screen 1300 may also include an add mode cancel button 1302, an add mode back button 1303, an add mode next button 1304, and an add mode finish button 1305, which may all be implemented similar to cancel button 202, back button 203, next button 204 and finish button 205, respectively. Update mode define services screen 1300 may also include an update mode add service selection 1311, an update mode update service selection 1312, an update mode find service selection 1313, an update mode delete service selection 1314, an update mode close service selection 1315, an update mode cancel service selection 1316, an update mode year transfer service selection 1317, an update mode log service selection 1318, an update mode manage series service selection 1319, and an update mode create default form service selection 1320. Update mode define services screen 1300 may further include an update mode log name field 1330 that may be used to display the name of the log table name to that is to be updated. Each of the above fields may be filled with the appropriate service information that is stored with the user-defined object to be updated. The user may add and delete the services associated with the user defined object by selecting and de-selecting service selections. If the user adds a service, operation will continue as described above for FIG. 5, including the presentation of additional forms associated with setting each service. In some embodiments of the present invention, manage series service selection 1319 may be prevented from being changed.

Figure 14:
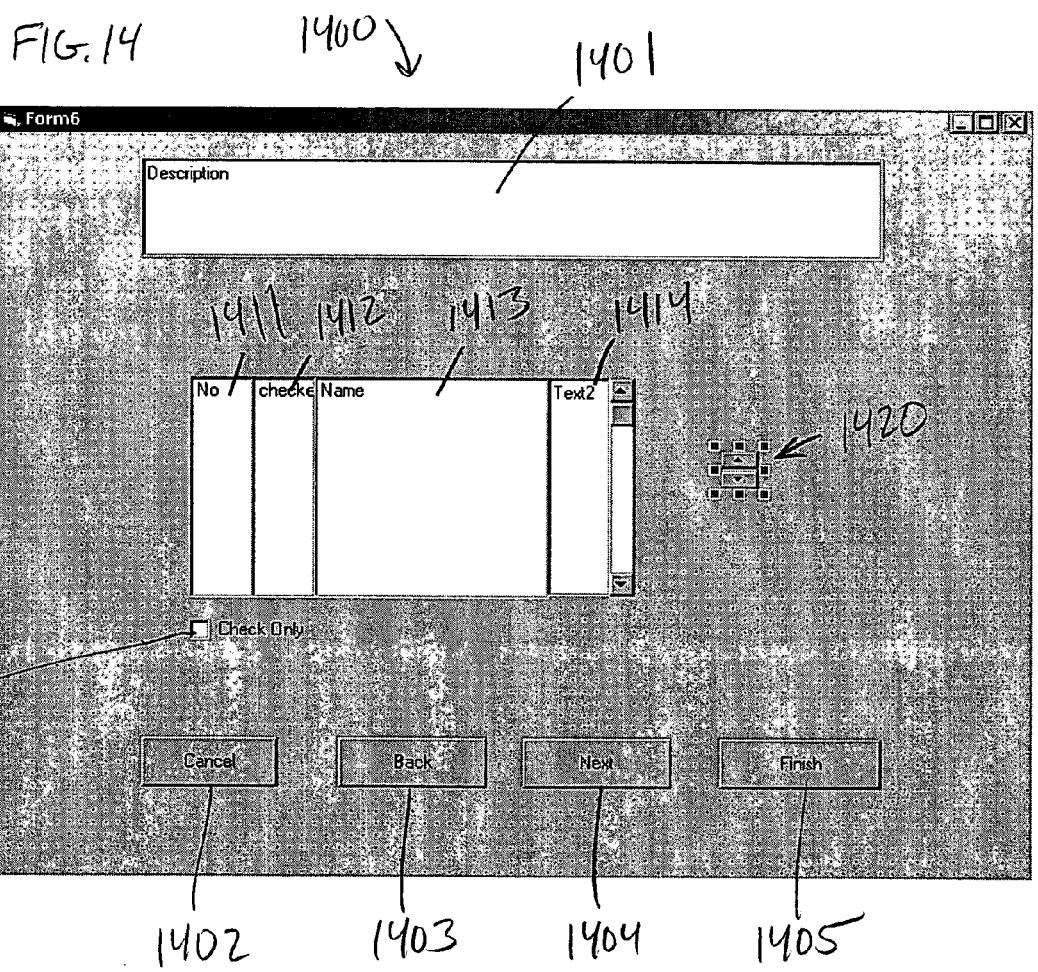
FIG. 14 is a screen shot of the graphical user interface form to provide a listing of a plurality of fields to be selected to be displayed on a form for a son object in the update mode in the application program, in accordance with an embodiment of the present invention.

FIG. 14 is a screen shot of a GUI form to provide a listing of a plurality of fields to be selected to be displayed on a form for a son object in the update mode in the application program. In this exemplary embodiment, the GUI form resembles the form shown in FIG. 7, although different forms could be used. In FIG. 14, an update son default form screen 1400 may include an update son default form text box 1401 in which a description of the create default form may be provided. Update son default form screen 1400 may also include an update son form cancel button 1402, an update son form back button 1403, an update son form next button 1404, and an update son form finish button 1405, which may all be implemented similar to cancel button 202, back button 203, next button 204 and finish button 205, respectively. Update son default form screen 1400 may further include an update son display area 1410 that may have an update field number column 1411, an update checked column 1412, an update name column 1413 and an update text2 column 1414, where each column may be used to display information for all of the sons in the application. For example, all the relevant sons may be displayed according to the type of the user-defined object, the relevant sons may not belong to other objects, and the table may be empty. Update text2 column 1414, which may be an optionally displayed column, may be used as the log service column for the sons. In general, update text2 column 1414 may be shown only if the user selected log service selection 518 in FIG. 5 or log service selection 1318 in FIG. 13. In FIG. 14, update text2 column 1414 may display a name for the log table to be updated and that may be changed by the user. An update arrow control bar 1420 may be used to set the order in which the sons may be displayed within the form. Update son default form screen 1400 may still further include an update check only check box 1430, which may cause only those sons relevant to the user-defined object to be displayed in update son display area 1410. In case the user defines sons and checked create default form service selection 520 in define services screen 500 in FIG. 5, or checked an update mode create default form service selection 1320 in FIG. 13, a create default form screen may be displayed and the user may choose only one son to be associated with this service.

In FIG. 14, in accordance with an embodiment of the present invention, the user may only be able to add sons, as described above relative to FIG. 5, and previously selected sons may be displayed as read-only fields information. As in FIG. 5, if the user selected log service selection 518 in FIG. 5, or in FIG. 13, if the user selected the update mode log service selection 1318, the optional field text2 may be displayed in update son display area 1410. In general, the user may not change the order of the son objects in update son display area 1410.

Figure 15:
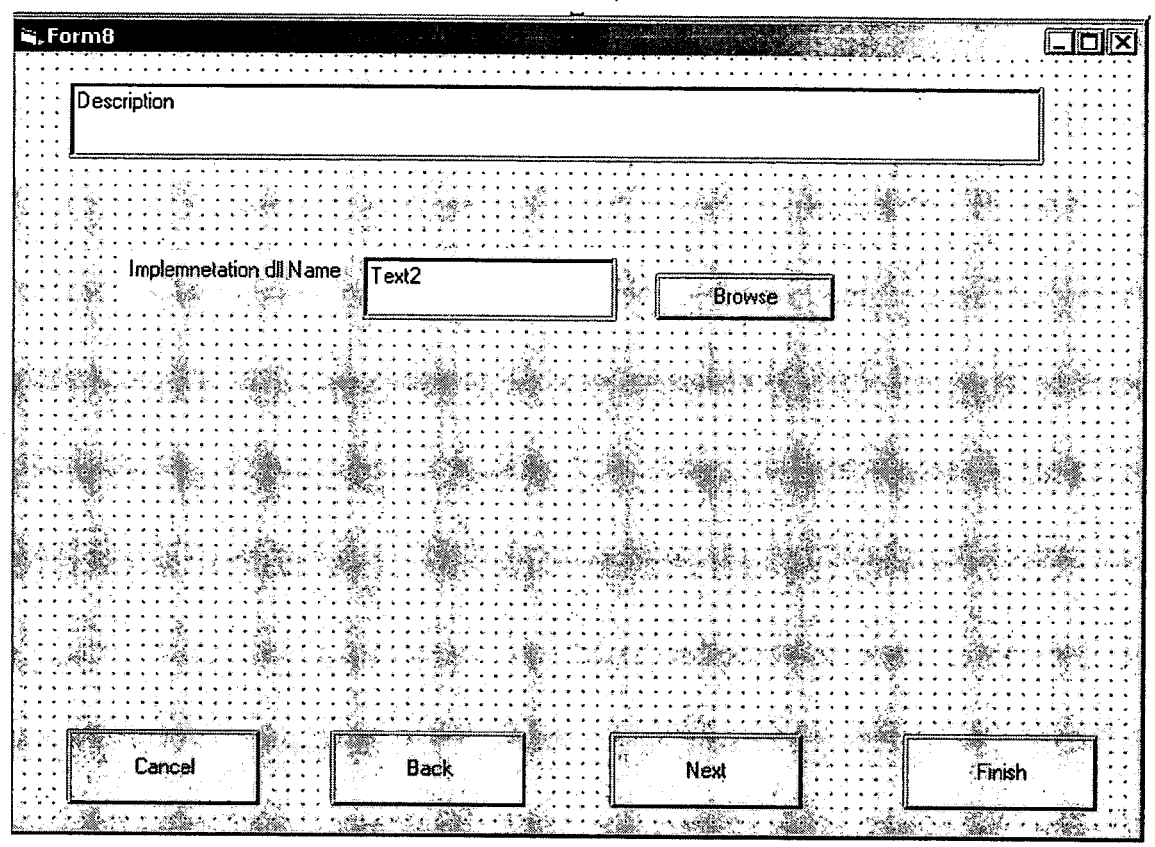
FIG. 15 is a screen shot of the graphical user interface form to provide a listing of a plurality of service extensions for updating the service extensions to be added to the base class of services in the application program, in accordance with an embodiment of the present invention.

FIG. 15 is a screen shot of the GUI form to update an associated implementation data link library having business logic with the user-defined object in the application program. In this exemplary embodiment, the GUI form resembles the form shown in FIG. 9, although different forms could be used. In FIG. 15, an update implementation screen 1500 may be formatted as described in FIG. 9 for implementation screen 900 so, in FIG. 15, the user may un-register the implementation DLL that was previously associated with the user-defined object. However, to associate another implementation DLL with the user-defined object, the user may use implementation screen 900 as described in FIG. 9.

Figure 16:
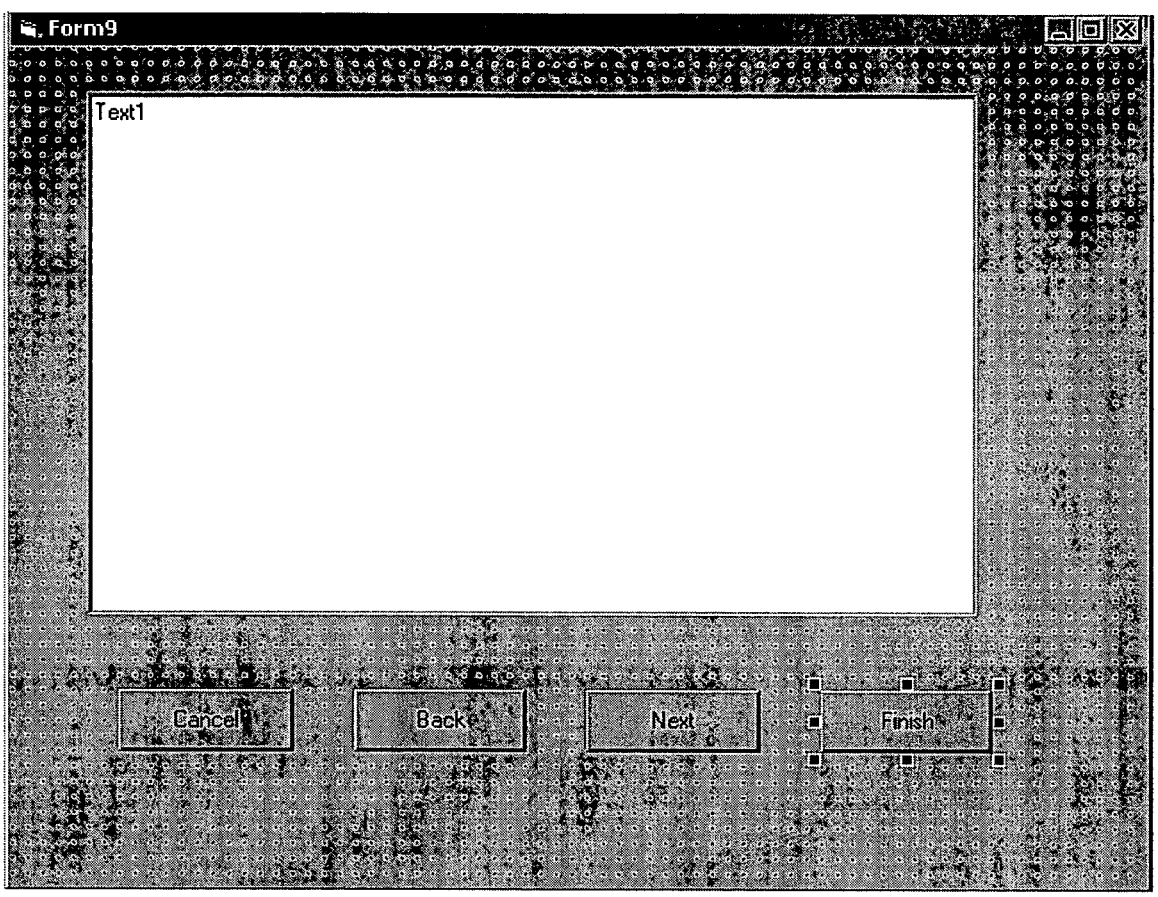
FIG. 16 is a screen shot of a graphical user interface form to provide a summary screen to display a status of the updating of the user-defined object in the application program, in accordance with an embodiment of the present invention.

FIG. 16 is a screen shot of a graphical user interface form to provide a summary screen to display a status of the updating of the user-defined object in the application program. In this exemplary embodiment, the GUI form resembles the form shown in FIG. 10, although different forms could be used. In FIG. 16, an update summary screen 1600 may include the same fields as in summary screen 1000 from FIG. 10, except, in FIG. 16, the status messages that may be presented will relate to the success and/or failure of the update process.

In accordance with an embodiment of the present invention, if the user chooses to use the delete mode by selecting delete object selection 314 in FIG. 3, a delete mode screen, which may be similar to and operate like FIGS. 4 and 12 described above. In general, in delete mode, all fields may be read only, since changes are not the desired function of the delete mode. In addition, the user may have access to all of the add and/or update screens described above for the user-defined object and can finish the operation from each screen. In a delete summary screen (not shown), the wizard may display a message to verify with the user that the user really wants to delete the selected user-defined object.

In general, the embodiments illustrated in FIGS. 2-16 are preferably implemented utilising business software application having a built-in system business object designed to register and host the user-defined objects. The registration itself is done using this system business object, and can be done either with the user defined object registration wizard of the business software application, or with a DI API by which a user-defined object provider could register objects during set-up of the set-up of the user-defined object.

Figure 17:
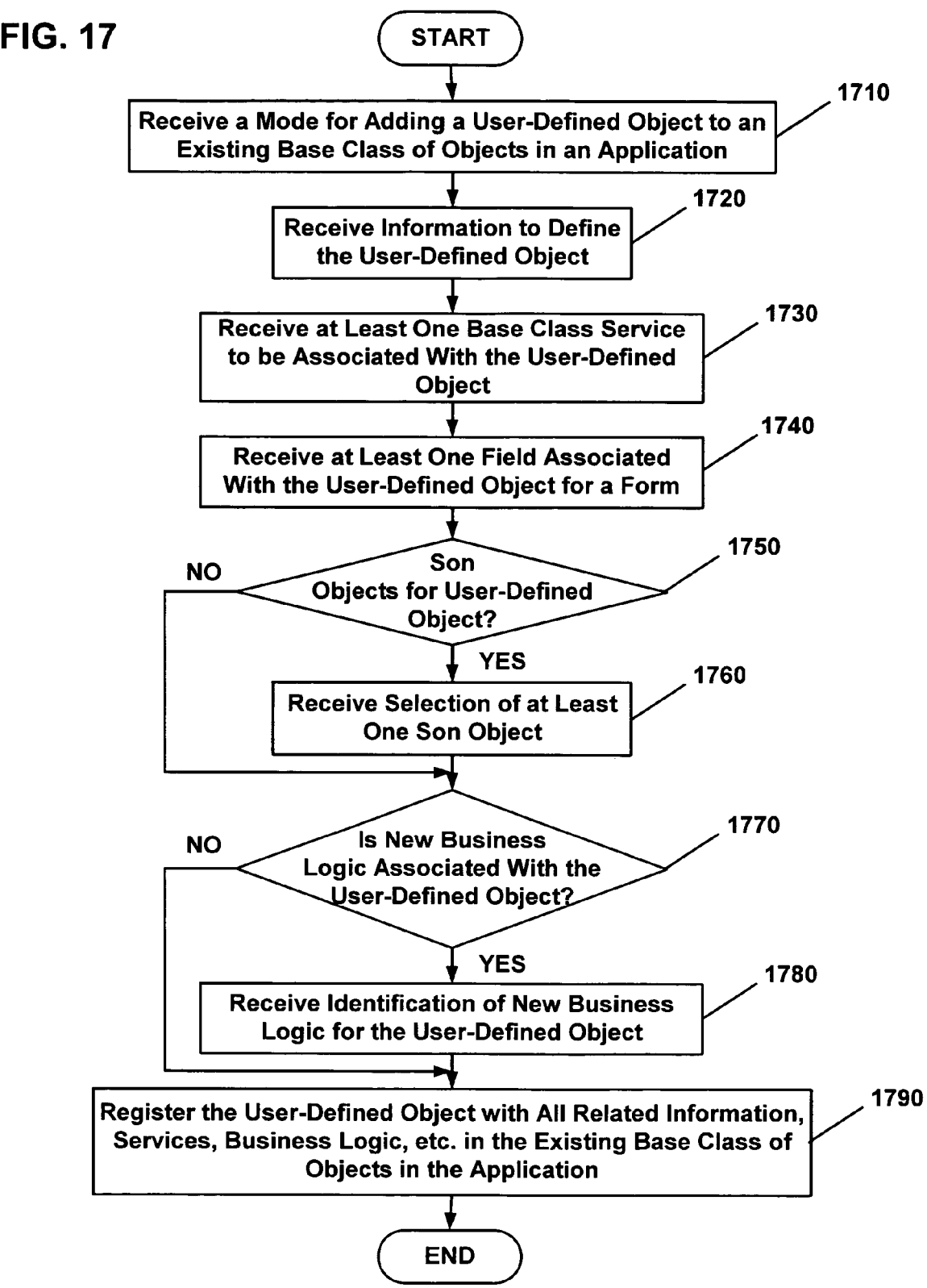
FIG. 17 is a flow diagram of a method for adding a user-defined object to an existing application so that the user-defined object may inherit the services of a base class of objects provided with the application, in accordance with an embodiment of the present invention.

FIG. 17 is a flow diagram of a method for adding a user-defined object to an existing application so that the user-defined object may inherit the services of a base class of objects provided with the application, in accordance with an embodiment of the present invention. In FIG. 17, a method 1700 may include receiving (1710) a mode for adding a user-defined object to an application, for example, using a wizard and a DI API. The method may include receiving (1720) information to define the user-defined object in the application, which may also be through the wizard. For example, the information may include a unique ID, a name, a type, and a table that may be associated with the user-defined object. The method may also include receiving (1730) at least one base class service, for example, in an implementation DLL, to be associated with the user-defined object. It is also contemplated that, in some embodiments of the present invention, new base class services may be added to the application without being specifically associated with a user-defined object. The method may further include receiving (1740) at least one field associated with the user-defined object for a form.

In FIG. 17, in accordance with the present invention, the method may include determining (1750) whether the user-defined object has any associated son objects and, if it does, the method may include receiving (1760) a selection of at least one son object to be associated with the user-defined object via the wizard. If the user-defined object is determined (1750) not to have any son objects or the method has received (1760) the selection of at least one son object, the method may determine (1770) whether there is new business logic to be associated with the user-defined object. If the user-defined object is determined (1770) to be associated with new business logic, the method may include receiving an identification of the new business logic for the user-defined object. The method may further include registering (1790) the user-defined object with all related information, services and business logic that may have been entered through the wizard for the user-defined object.

Figure 18:
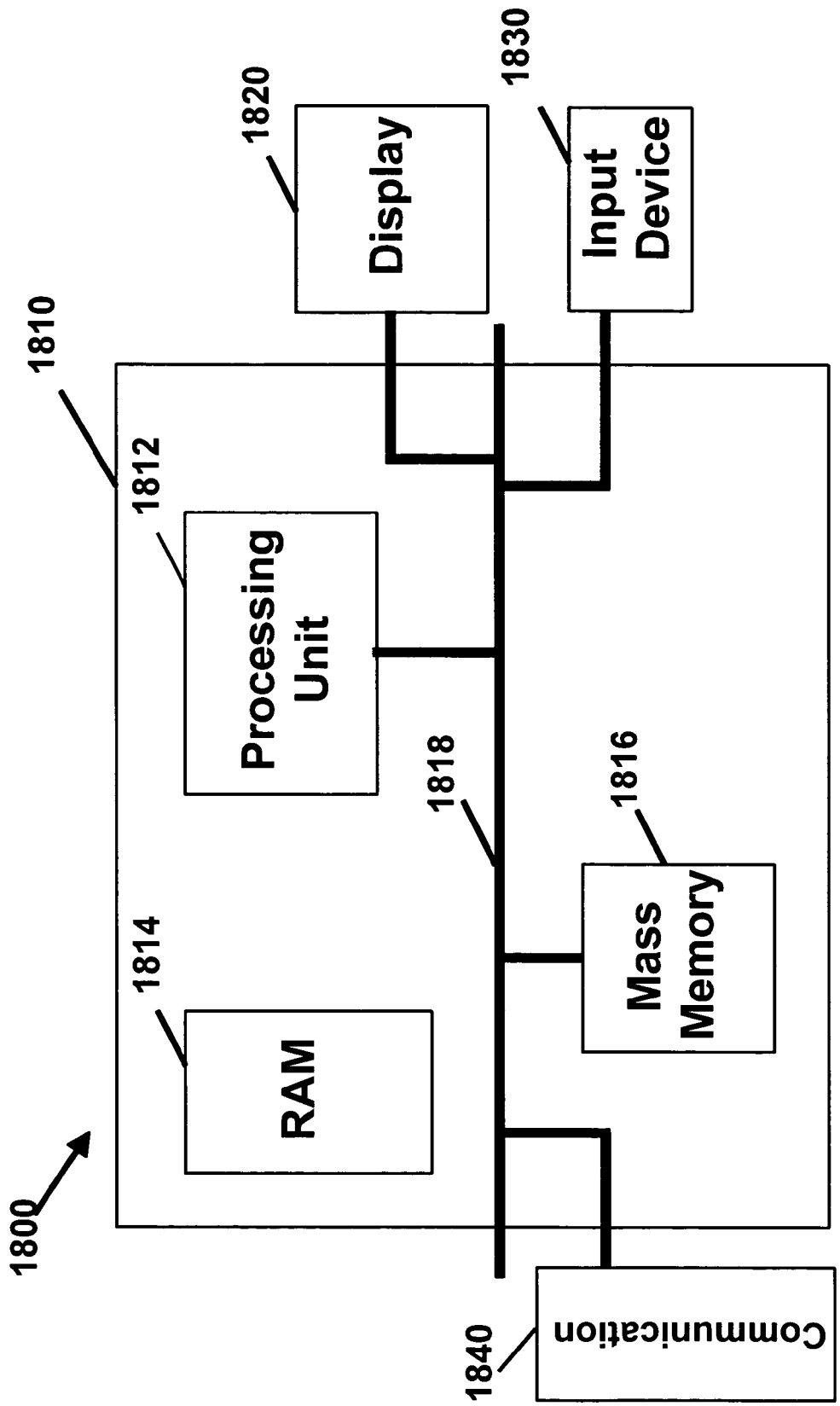
FIG. 18 is a block diagram of a client computer system for providing data exchange between applications having incompatible user interfaces and a database implemented to operate with a different user interface, in accordance with an embodiment of the present invention.

FIG. 18 is a block diagram of a client computer system for providing data exchange between applications having incompatible user interfaces and a database implemented to operate with a different user interface, in accordance with an embodiment of the present invention. In FIG. 18, a client computer system 1800 includes a processing component 1810 coupled to a display component 1820, an input component 1830 and a communication component 1840. Processing component 1810 may include a central processing unit 1812, a random access memory (RAM) 1814 and a mass memory system 1816 coupled together via a main system bus 1818. Mass memory system 1818 may include, for example, an operating system, a browser program, a database data access component and an application for accessing an incompatible database. As exemplary implementations, the operating system may include Microsoft® Windows® 98 second edition, Windows® 2000 sp1 or higher, Windows® XP® or Windows® NT® with sp5 or higher. The browser program may include Microsoft® Internet Explorer 5.5 or higher. The database data access component may, for example, include Microsoft® data access component v2.5 (mdac_typ.exe). The application accessing the incompatible database may include a DI API and a UI API to enable the direct registration of a user-defined object and/or a DLL with a base class of objects and their related services in the application.

In FIG. 18, as further exemplary implementations, display component 1820 may be capable of displaying a plurality of colors, such as 24-bit colors, and may include a standard CRT, a liquid crystal display, and a flat panel display. Input component 1830 may include a keyboard, a writing tablet, and a voice-to-text. Communication component 1840 may include a dial-up modem, a digital cable modem, a direct network connection, and a wireless modem.

Several embodiments of the present invention are specifically illustrated and described herein. However, it will be appreciated that modifications and variations of the present invention are covered by the above teachings and come within the purview of the appended claims without departing from the spirit and intended scope of the invention.

What is claimed is:

1. A computer-implemented method comprising:
   receiving, via a graphical user interface displayed to a user on a computer display, information to create a user-defined object capable of displaying a form and interacting with a database within a business application, the information comprising:
      a selection of a mode with which to add the user-defined object in the business application having a base class of objects with a base class of database services;
      a selection of at least one database service from the base class of database services to be associated with the user-defined object, the database services defining respective database data manipulation services;
      a selection of a plurality of data-entry fields to be displayed with the form in the business application in association with the user-defined object;
      information to define a son object of the user-defined object, if the son object is associated with the user-defined object;
      an identification of business logic associated with the user-defined object, wherein the identification of the business logic includes identifying an implementation data link library by selecting from a list of available data link libraries shown to the user by the graphical user interface; and
      an instruction to register the user-defined object with the business application; and
   storing the user-defined object to a computer memory; and
   making the user-defined object available to the user in the business application,
   wherein the receiving of the information, the storing of the user-defined object, and the making of the user-defined object available in the business application occur without custom programming by the user.

2. The method of claim 1 further comprising:
   receiving a selection of one son object from the at least one son object, if the one son object is associated with the user-defined object; and
   receiving a listing of fields associated with the one son object for display on a son object form, if the selection of the one son object is received.

3. The method of claim 2 wherein said receiving the listing of fields associated with the one son object comprises:
   displaying the listing of the fields associated with the one son object one; and
   receiving an ordering of the fields associated with the one son object.

4. The method of claim 1 further comprising:
   receiving at least one business logic extension for the business application; and
   registering the at least one business logic extension with the business application.

5. The method of claim 1 wherein the graphical user interface is configured to provide the selection of the mode from among an add-new-object mode and an update-object mode.

6. The method of claim 1, wherein the graphical user interface is configured to display a listing of the base class of database services available to be associated with the user-defined object.

7. The method of claim 1 wherein said registering the user-defined object with the business application is performed using a data interface application programming interface.

8. The method of claim 1 wherein the method is performed using a wizard.

9. The method of claim 1 wherein said receiving the selection of plurality of fields associated with the user-defined object for display in the form comprises:
   displaying a plurality of base class fields to be associated with the user-defined object; and
   receiving a selection of a plurality of the displayed plurality of base class of fields.

10. The method of claim 1, the method further comprising:
    adding the business logic to the business application, if the user-defined object is to be associated with the business logic; and
    making the added business logic available to all objects in the base class of objects.

11. A computer-readable storage medium having stored thereon a plurality of executable instructions for performing a computer-implemented method comprising:
    receiving, via a graphical user interface displayed to a user on a computer display, information to create a user-defined object capable of displaying a form and interacting with a database within a business application, the information comprising:
       a selection of a mode with which to add the user-defined object in the business application having a base class of objects with a base class of database services;
       a selection of at least one database service from the base class of database services to be associated with the user-defined object, the database services defining respective database data manipulation services;
       a selection of a plurality of data-entry fields to be displayed with the form in the business application in association with the user-defined object;
       information to define a son object of the user-defined object, if the son object is associated with the user-defined object;
       an identification of business logic associated with the user-defined object, wherein the identification of the business logic includes identifying an implementation data link library by selecting from a list of available data link libraries shown to the user by the graphical user interface; and
       an instruction to register the user-defined object with the business application; and
    storing the user-defined object to a computer memory; and
    making the user-defined object available to the user in the business application,
    wherein the receiving of the information, the storing of the user-defined object, and the making of the user-defined object available in the business application occur without custom programming by the user.

12. The computer-readable storage medium of claim 11 wherein the method further comprises:

receiving a selection of one son object from the at least one son object, if the one son object is associated with the user-defined object; and receiving a listing of fields associated with the one son object for display on a son object form, if the selection of the one son object is received.

13. The computer-readable storage medium of claim 12 wherein said receiving the listing of fields associated with the one son object comprises:

displaying the listing of the fields associated with the one son object one; and receiving an ordering of the fields associated with the one son object.

14. The computer-readable storage medium of claim 11 wherein the method further comprises:

receiving at least one business logic extension for the business application; and registering the at least one business logic extension with the business application.

15. The computer-readable storage medium of claim 11 wherein the graphical user interface is configured to provide the selection of the mode from among an add-new-object mode and an update-object mode.

16. The computer-readable storage medium of claim 11 wherein the graphical user interface is configured to display a listing of the base class of database services available to be associated with the user-defined object.

17. The computer-readable storage medium of claim 11 wherein said registering the user-defined object with the business application is performed using a data interface application programming interface.

18. The computer-readable storage medium of claim 11 wherein the method is performed using a wizard.

19. The computer-readable storage medium of claim 11 wherein said receiving the selection of the plurality of fields associated with the user-defined object for display in the form comprises:

displaying a plurality of base class fields to be associated with the user-defined object; and receiving a selection of a plurality of the displayed plurality of base class of fields.

20. The computer-readable storage medium of claim 11, the method further comprising:

adding the business logic to the business application, if the user-defined object is to be associated with the business logic; and making the added business logic available to all objects in the base class of objects.

21. A data processing computer system including a computer-readable storage medium having stored thereon a plurality of executable instructions, the data processing computer system comprising:

means for receiving, via a graphical user interface displayed to a user on a computer display, information to create a user-defined object capable of displaying a form and interacting with a database within a business application, the information comprising:

a selection of a mode with which to add the user-defined object in the business application having a base class of objects with a base class of database services;

a selection of at least one database service from the base class of database services to be associated with the user-defined object, the database services defining respective database data manipulation services;

an identification of a plurality of data-entry fields to be displayed with the form in the business application in association with the user-defined object;

information to define a son object of the user-defined object, if the son object is associated with the user-defined object;

an identification of business logic associated with the user-defined object, wherein the identification of the business logic includes identifying an implementation data link library by selecting from a list of available data link libraries shown to the user by the graphical user interface; and an instruction to register the user-defined object with the business application; and means for storing the user-defined object to a computer memory; and means for making the user-defined object available to the user in the business application, wherein the means for receiving the information, the means for storing the user-defined object, and the means for making the user-defined object available in the business application operate without custom programming by the user, and wherein at least some portion of the means for receiving the information, the means for storing the user defined object, and the means for making the user-defined object available in the business application operate as a function the plurality of executable instructions of the computer-readable storage medium.

22. The data processing system of claim 21 further comprising:

means for receiving a selection of one son object from the at least one son object, if the one son object is associated with the user-defined object; and means for receiving a listing of fields associated with the one son object for display on a son object form, if the selection of the one son object is received.

23. The data processing system of claim 22 wherein the means for receiving the listing of fields associated with the one son object comprises:

means for displaying the listing of the fields associated with the one son object one; and means for receiving an ordering of the fields associated with the one son object.

24. The data processing system of claim 21 further comprising:

means for receiving at least one business logic extension for the business application; and means for registering the at least one business logic extension with the business application.

25. The data processing system of claim 21 wherein the graphical user interface is configured to provided the selection of the mode from among an add-new-object mode and an update-object mode.

26. The data processing system of claim 21 wherein the graphical user interface is configured to display a listing of the base class of database services available to be associated with the user-defined object.

27. The data processing system of claim 21 wherein the means for registering the user-defined object with the business application is performed using a data interface application programming interface.

28. The data processing system of claim 21 wherein the method is performed using a wizard.

29. The data processing system of claim 21 wherein the means for receiving the selection of the plurality of fields associated with the user-defined object for display in the form comprises:

means for displaying a plurality of base class fields to be associated with the user-defined object; and means for receiving a selection of a plurality of the displayed plurality of base class of fields.

30. The data processing system of claim 21, the method further comprising:

means for adding the business logic to the business application, if the user-defined object is to be associated with the business logic; and means for making the added business logic available to all objects in the base class of objects.

31. The method of claim 1, wherein the selection of the plurality of fields includes a selection of their order of display on the form in the business application.

32. The method of claim 1, wherein the graphical user interface is configured to enable the user to provide a name of the implementation data link library and also to display a list of available implementation data link libraries.

* * * * *